(12) United States Patent
Foret

(10) Patent No.: US 9,481,584 B2
(45) Date of Patent: Nov. 1, 2016

(54) SYSTEM, METHOD AND APPARATUS FOR TREATING LIQUIDS WITH WAVE ENERGY FROM PLASMA

(75) Inventor: Todd Foret, Lafayette, LA (US)

(73) Assignee: Foret Plasma Labs, LLC, The Woodlands, TX (US)

( * ) Notice: Subject to any disclaimer, the term of this patent is extended or adjusted under 35 U.S.C. 154(b) by 2164 days.

(21) Appl. No.: 11/784,327

(22) Filed: Apr. 5, 2007

(65) Prior Publication Data

US 2007/0253874 A1    Nov. 1, 2007

Related U.S. Application Data

(63) Continuation-in-part of application No. 10/196,466, filed on Jul. 15, 2002, now Pat. No. 7,622,693.

(60) Provisional application No. 60/789,655, filed on Apr. 5, 2006, provisional application No. 60/305,833, filed on Jul. 16, 2001.

(51) Int. Cl.
  *C02F 1/30*    (2006.01)
  *C02F 1/00*    (2006.01)
  *C02F 1/34*    (2006.01)
  *C02F 1/46*    (2006.01)

(52) U.S. Cl.
  CPC .............. *C02F 1/30* (2013.01); *C02F 1/006* (2013.01); *C02F 1/34* (2013.01); *C02F 1/302* (2013.01); *C02F 1/305* (2013.01); *C02F 1/4608* (2013.01); *C02F 2301/024* (2013.01); *C02F 2301/026* (2013.01)

(58) Field of Classification Search
  USPC ............ 219/121.36, 121.47, 121.48, 121.37; 210/695, 748, 787–788, 222, 223, 243
  See application file for complete search history.

(56) References Cited

U.S. PATENT DOCUMENTS

| 2,139,657 A | 12/1938 | Baeckler |
| 2,260,823 A | 10/1941 | Bettis |
| 2,705,219 A | 3/1955 | Heiskell et al. |
| 3,201,337 A | 8/1965 | Eichelberger et al. |
| 3,324,334 A | 6/1967 | Reed |
| 3,567,921 A | 3/1971 | Holiday |
| 3,769,517 A | 10/1973 | Coleman |
| 3,772,172 A | 11/1973 | Zhagatspanian et al. |

(Continued)

FOREIGN PATENT DOCUMENTS

| KR | 10-2004-0005107 | 1/2004 |
| WO | 99/04607 | 1/1999 |

OTHER PUBLICATIONS

International Search Report and Written Opinion for PCT/US2007/008529 dated Jun. 11, 2008.

(Continued)

*Primary Examiner* — Brian Jennison
(74) *Attorney, Agent, or Firm* — Daniel J. Chalker; Edwin S. Flores; Chalker Flores LLP

(57) ABSTRACT

The present invention provides a system, method and apparatus for treating a liquid by providing a sanitary type stainless steel hydrocyclone, flowing the liquid through the hydrocyclone, and turning on a plasma torch attached to the hydrocyclone such that a plasma arc irradiates the liquid. The hydrocyclone can be a forward flow hydrocyclone, a reverse flow hydrocyclone, a through flow hydrocyclone, a hydrocyclone pump or a volute.

16 Claims, 19 Drawing Sheets

(56) References Cited

U.S. PATENT DOCUMENTS

| | | | |
|---|---|---|---|
| 3,826,920 A | 7/1974 | Woodroffe et al. | |
| 3,917,479 A * | 11/1975 | Sayce et al. | 75/10.19 |
| 3,924,246 A | 12/1975 | Scherer | |
| 3,998,477 A | 12/1976 | Delahaye et al. | |
| 4,002,918 A | 1/1977 | Graentzel | |
| 4,279,743 A | 7/1981 | Miller | |
| 4,296,066 A | 10/1981 | Schenck | |
| 4,317,041 A | 2/1982 | Schenck | |
| 4,381,978 A | 5/1983 | Gratzel et al. | |
| 4,397,823 A | 8/1983 | Dimpfl | |
| 4,427,636 A | 1/1984 | Obenshain | |
| 4,448,935 A | 5/1984 | Iovine et al. | |
| 4,454,835 A | 6/1984 | Walsh et al. | |
| 4,476,105 A | 10/1984 | Greenbaum | |
| 4,488,935 A | 12/1984 | Ruhe | |
| 4,544,470 A | 10/1985 | Hetrick | |
| 4,622,115 A | 11/1986 | O'Neill | |
| 4,626,648 A | 12/1986 | Browning | |
| 4,774,026 A | 9/1988 | Kitamori et al. | |
| 4,803,365 A | 2/1989 | Krause et al. | |
| 4,863,608 A | 9/1989 | Kawai et al. | |
| 4,868,127 A | 9/1989 | Blades et al. | |
| 4,948,980 A | 8/1990 | Wedekamp | |
| 4,957,773 A | 9/1990 | Spencer et al. | |
| 5,045,288 A | 9/1991 | Raupp et al. | |
| 5,094,815 A | 3/1992 | Conboy et al. | |
| 5,120,450 A | 6/1992 | Stanley, Jr. | |
| 5,124,131 A | 6/1992 | Wekhof | |
| 5,126,111 A | 6/1992 | Al-Ekabi et al. | |
| 5,149,377 A | 9/1992 | Esrom et al. | |
| 5,166,950 A | 11/1992 | Jouvaud et al. | |
| 5,200,156 A | 4/1993 | Wedekamp | |
| 5,413,768 A | 5/1995 | Stanley, Jr. | |
| 5,439,595 A | 8/1995 | Downey, Jr. | |
| 5,439,652 A | 8/1995 | Sczechowski et al. | |
| 5,529,701 A | 6/1996 | Grisham et al. | |
| 5,531,904 A | 7/1996 | Grisham et al. | |
| 5,611,896 A | 3/1997 | Swanepoel et al. | |
| 5,662,811 A | 9/1997 | Grisham et al. | |
| 5,664,733 A | 9/1997 | Lott | |
| 5,680,014 A | 10/1997 | Miyamoto et al. | |
| 5,696,380 A | 12/1997 | Cooke et al. | |
| 5,730,875 A | 3/1998 | Grisham et al. | |
| 5,832,361 A | 11/1998 | Foret | |
| 5,866,910 A | 2/1999 | Cooke et al. | |
| 5,994,705 A | 11/1999 | Cooke et al. | |
| 6,004,386 A | 12/1999 | Grisham et al. | |
| 6,019,947 A | 2/2000 | Kucherov | |
| 6,090,296 A | 7/2000 | Oster | |
| 6,187,206 B1 | 2/2001 | Bernier et al. | |
| 6,355,178 B1 * | 3/2002 | Couture et al. | 210/748.05 |
| 6,565,803 B1 | 5/2003 | Bolton et al. | |
| 6,630,113 B1 * | 10/2003 | Surma | 422/199 |
| 6,693,253 B2 | 2/2004 | Boulos et al. | |
| 6,713,771 B2 | 3/2004 | Nakagawa et al. | |
| 6,987,792 B2 | 1/2006 | Do et al. | |
| 7,422,695 B2 | 9/2008 | Foret | |
| 7,578,937 B2 | 8/2009 | Foret | |
| 2001/0047964 A1 | 12/2001 | Matherly et al. | |
| 2004/0020188 A1 | 2/2004 | Kramer et al. | |
| 2006/0163054 A1 | 7/2006 | Spitzl et al. | |

OTHER PUBLICATIONS

International Search Report and Written Opinion for PCT/US2009/033979 dated Sep. 15, 2009.

"Lectures: On Illuminating Engineering Delivered at the John Hopkins University", Published 1911 Johns Hopkins Press, p. 140.

* cited by examiner

SYSTEM, METHOD AND APPARATUS FOR TREATING LIQUIDS WITH WAVE ENERGY FROM PLASMA

PRIORITY CLAIM AND CROSS-REFERENCE TO RELATED APPLICATIONS

This patent application is: (a) continuation-in-part application of U.S. patent application Ser. No. 10/196,466 filed on Jul. 15, 2002 and entitled "Plasma Whirl Reactor Apparatus and Methods of Use" which is a non-provisional application of U.S. provisional patent application 60/305,833 filed on Jul. 16, 2001; (b) a non-provisional application of U.S. provisional patent application 60/789,655 filed on Apr. 5, 2006 and entitled "System, Method and Apparatus for Treating Liquids with Wave Energy from Plasma"; and (c) related to (i) U.S. patent application Ser. No.11/784,326 filed on Apr. 5, 2007 and entitled "System, Method and Apparatus for Treating Liquids with Wave Energy from an Electrical Arc" which is a non-provisional application of U.S. provisional patent application 60/789,670 filed on Apr. 5, 2006 and entitled "System, Method and Apparatus for Treating Liquids with Wave Energy from an Electrical Arc" and (ii) U.S. patent application Ser. No. 10/935,786 filed on Sep. 7, 2004 and entitled "Treatment of Fluids with Wave Energy from a Carbon Arc" which is a non-provisional application of U.S. provisional patent application 60/500,445 filed on Sep. 5, 2003. All of the foregoing applications are hereby incorporated by reference in their entirety.

FIELD OF THE INVENTION

The present invention relates generally to the field of treating liquids, and more particularly, to a method, system and apparatus for treating liquids with wave energy produced from plasma.

BACKGROUND OF THE INVENTION

Without limiting the scope of the invention, its background is described in connection with treating liquids in particular drinking water, wastewater, beverages, juices, milk, emulsions, ballast water, bilge water, cooling tower water, process water, mill water, raw sewage, crude oil, hydrocarbon streams, black liquor and any pumpable liquid, as an example. There are various liquid streams that must be treated or processed in order to meet quality control standards or discharge permit requirements. For example, drinking water may be considered a product that must meet strict treatment requirements such as disinfection in order to render the water safe for human consumption. Likewise, there are other contaminants which may affect the quality of the water, such as iron, arsenic, hydrogen sulfide, organics and turbidity.

Once the drinking water leaves the faucet at a residential location it is now referred to as wastewater. Wastewater must also be treated in order to remove contaminants prior to discharge. One treatment method that is rapidly gaining in popularity is the use of UV radiation for disinfecting wastewater. Likewise, it is also being used for disinfecting drinking water. Another application that is being used in combination with UV radiation is the addition of an oxidant such as hydrogen peroxide or ozone in order to form hydroxyl radicals.

There are several major water streams that have gained widespread attention within the past few years. First, when left untreated, combined sewer overflows (CSO) and stormwater affect receiving streams. During heavy rainfall the shear volume of stormwater that must be treated has challenged engineers, scientists and municipalities. Two pollutants commonly found in CSO and stormwater runoff are floatables and pathogens. The US EPA, municipalities, scientists and engineers are currently searching for an extremely rugged CSO and stormwater treatment system that can both filter and disinfect prior to discharge to receiving streams.

Another water discharge that has challenged the marine water treatment industry is water discharged during ballasting operations for large ships. The problem with ballast water is that it may carry non-indigenous species that when discharged into a new environment can literally overwhelm and eradicate other lifeforms within that ecosystem. Thus, ballast water must now be disinfected prior to release. Likewise, ballast water may contain oil and grease residuals which must be removed prior to discharge.

Hydrocarbon contaminants, especially water soluble organics (WSO) have plaqued another industry that operates in a marine environment. Offshore Oil and gas production platforms produce copious amounts of water along with the oil and gas. The produced water often contains WSO which must be removed from the water prior discharge. Although mechanical separators, such as hydrocyclones, can remove the insoluble hydrocarbon fraction, the soluble organics require extensive as well as expensive treatment methods such as acid extraction.

At land production wells, another contaminant, salt must be removed via evaporation or reverse osmosis prior to discharge or must be disposed via deep well injection. Likewise, when a well is drilled and then fractured, the flowback water must be treated prior to discharge.

Typically, most municipal water treatment facilities, both drinking water and wastewater incorporate some form of oxidation. This may be in the form of biological oxidation or addition of an oxidant such as chlorine, bleach or ozone. Many industrial wastewater streams have a very high chemical oxidation demand (COD). Thus, the water must be pretreated prior to discharge to a biological oxidation wastewater treatment plant.

One such industrial process stream is spent caustic produced from ethylene plants. Another oxidation process, wet air oxidation, is commonly used to oxidize the organics within spent caustic. Wet air oxidation consists of adding oxygen to the stream then heating and pressurizing the stream in order to oxidize the containments. Due to the high pressures and temperatures coupled with the addition of oxygen, exotic metals must be used in order to prevent corrosion, another form of oxidation.

Two other streams found in another industry, the pulp and paper industry, must be oxidized prior to use. First, pulp is oxidized to remove color. The pulping liquors must be oxidized in order to recover the valuable chemicals. However, the black liquor must be evaporated to remove access water that will not support combustion or oxidation of the black liquor. Likewise, the pulp must be separated and filtered in order to remove fines.

A common mechanical separator used in pulp and paper mills, on drilling rigs, in the mining industry and the oil, gas and oilsands industry is the hydrocyclone. Hydrocyclone separators are commonly used for phase separation purposes. Particles or fluids with a different density than water or the bulk liquid can be separated utilizing centripal force by means of a hydrocyclone. Hence, if the fluid is a liquid, a cyclone separator is typically referred to as a hydrocyclone, regardless if the bulk liquid is water, crude oil, gasoline, drilling fluid or any other liquid. And if the bulk fluid is a gas, then it is commonly referred to as a cyclone separator.

Hydrocyclones are normally classified according to flow direction. For example, referring to prior art hydrocyclones as shown in FIG. 13, a forward flow hydrocyclone A discharges the accepts 1302 in the same axial direction as the bulk flow. The rejects 1304 are reversed and exit opposite of the bulk flow direction. Reverse Flow Hydrocyclones B discharges the accepts 1302 via a vortex finder and must reverse its axial direction with respect to initial bulk flow. A Throughflow Hydrocyclone C discharges both its accepts 1302 and rejects 1304 in the same axial direction of the bulk liquid flow. In all three hydrocyclones the whirl, swirl or vortex flow direction remains unchanged with respect to the initial rotation imparted on the fluid via the volute—clockwise or counterclockwise.

It is well known and well understood that the hydrocyclone forms a gas core in the center if open to atmosphere or a gas is injected into the hydrocyclone. The gas seeks the center of the hydrocyclone, since air or gases are less dense than water. Likewise, solids and liquids that are more dense than water will be forced outward and ejected through the apex valve and thus can be separated from the bulk liquid. Also, the less dense gas and water are ejected and discharged through the vortex finder.

All of the aforementioned liquids, in one manner or another, are treated with both separation and oxidation. For example, if oxidation will occur at elevated temperatures, such as wet air oxidation, the liquid must be preheated in order to start the reaction between dissolved oxygen and organics. The furnace tube used in wet air oxidation systems is very costly and transfers heat via conduction—through the wall of the pipe. For wet air oxidation to become a mainstream treatment technology another form of heating must be used in order to reduce both the operating costs as well as capital expense.

SUMMARY OF THE INVENTION

The present invention provides a simple and cost effective method, system and apparatus for treating water by synergistically combining and retrofitting an off-the-shelf plasma torch with a hydrocyclone. The present invention provides a plasma arc torch heat processing system for disposal of organic waste in a much smaller volume than conventional incinerators or plasma reactors, and at a higher processing rate to produce a benign gaseous discharge. The present invention also reduces the effect of thermal stresses associated with rapid startup and shut down of the plasma source. In addition, the present invention reduces labor intensive maintenance and operational costs associated with plasma thermal processing equipment as well as the associated facilities for waste infeed thereto.

More specifically, the present invention provides a method for treating a liquid by providing a santitary type stainless steel hydrocyclone, flowing the liquid through the hydrocyclone, and turning on a plasma torch attached to the hydrocyclone such that a plasma arc irradiates the liquid. The hydrocyclone can be a forward flow hydrocyclone, a reverse flow hydrocyclone, a through flow hydrocyclone, a hydrocyclone pump or a volute.

In addition, the present invention provides an apparatus for treating a liquid that includes a pump volute or hydrocyclone head, a throat connected to the pump volute or hydrocyclone head, and a plasma torch attached to the pump volute or hydrocyclone such that a plasma arc irradiates the liquid. Note that the apparatus can be used as a retrofit kit.

The present invention also provides a system for treating a liquid that includes a storage tank, a pump volute or hydrocyclone head, a throat connected to the pump volute or hydrocyclone head and a top of the storage tank and a plasma torch attached to the pump volute or hydrocyclone such that a plasma arc irradiates the liquid.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

Figure 1:
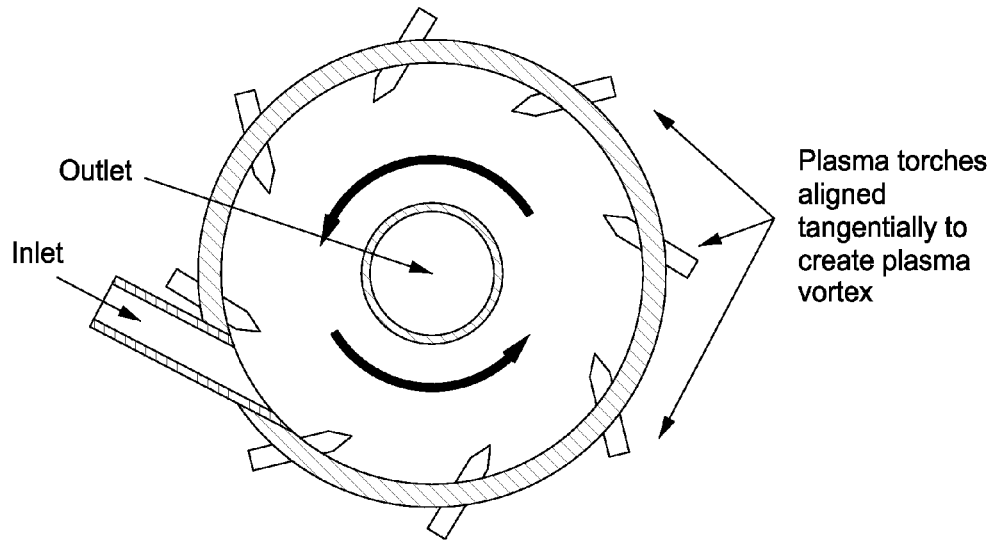
FIG. 1 is a diagrammatic, cross-sectional top view of a first embodiment Plasma Jet Vortex Mill Reactor.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to treating water, but it will be understood that the concepts of the present invention are applicable to treating any liquid.

The term "wave energy" is used herein to include radiation as well as wave energies transmitted by various mediums, and embraces electromagnetic waves or radiations; sonic, supersonic, and ultrasonic waves; neutrons, protons, deuteron, and other corpuscular radiations. The term "electromagnetic waves" includes, e.g., X-ray and gamma-ray, ultraviolet, infra red, and visible light rays, microwave, and both short electric and radio waves.

The present invention encompasses methodology and apparatuses configured for forming and utilizing a plasma torch in combination with a hydrocyclone for treating liquids. For purposes of interpreting this disclosure and the claims that follow, a "plasma whirl hydrocyclone or volute" is defined as an angular momentum generator in which a plasma torch is synergistically used with a whirling liquid to produce either chemical or thermal reactions which aid in both separation and oxidation. Likewise, the term "treating" is defined herein to include but not limited to pyrolysis, gasifcation, cracking, combustion, desorption and incineration.

Other embodiments of the present invention encompass methodology and apparatuses configured for forming and utilizing plasma jet for one or more of comminution, chemical reaction and separation in a single reactor system. For purposes of interpreting this disclosure and the claims that follow, a "plasma whirl comminution reactor" is defined as a reactor in which comminution and conversion of matter occurs therein. This is achieved because of the plasma's kinetic energy traveling at a high velocity in a vortex as well as the characteristics associated with a plasma (high temperature, radicals, free electrons, ions, etc). The high velocity plasma jet used in the present invention simultaneously subjects material to comminution and chemical reaction or conversion. The term "comminution" as used herein can be considered to be generic to all the terms ordinarily applied to the subject matter of the present invention such as grinding, crushing, grating, granulating, milling, disintegration, attrition, trituration, pulverization, etc. In its broadest meaning, the term comminution, as used herein, will also mean atomization. The terms vortex, cyclone, tornado, whirlpool, whirl, swirl, etc. are used interchangeably herein. These terms refer to a mass of fluid with a whirling or circular motion that tends to form a cavity or vacuum in the center of the circle and to draw toward this cavity or vacuum bodies subject to its action. In other words, the term "whirl, vortex, tornado or cyclone" as used in the present invention applies to a region within a body of fluid in which the fluid elements have an angular velocity or angular momentum. The term "chemical conversion" as defined herein includes the terms cracking, reforming, gasification, combustion, oxidation, reduction, etc. Simply put a chemical conversion with respect to the present invention means a "chemical reaction." As defined herein, plasmas are ionized gases which can be formed from DC plasma torches, microwave plasma torches, inductively coupled plasma torches, AC plasma torches, electron beams or any other means which will generate an ionized gas. In its broadest meaning the plasma may be generated from any wave energy apparatus or method capable of producing an ionized gas. Matter as defined herein refers to the four states of matter; solids, liquids, gases and/or plasmas.

As described below in reference to FIGS. 1-12, a plasma whirl kinetic energy comminution reactor uses a high velocity plasma jet fluid to create a plasma whirl for comminuting matter while chemically reacting the matter. Likewise, when operated in another mode, the plasma jet vortex mill reactor utilizes a high velocity plasma jet fluid to create a plasma vortex for chemically reacting matter and separating the products of the reaction of the matter.

FIG. 1 is representation of a Plasma Jet Vortex Mill Reactor. Plasma torches are aligned tangentially to create angular momentum that forms a plasma vortex. Solid matter, for example Municipal Solid Waste (MSW), drill cuttings, red mud, coal fines, petroleum coke, WEEE, etc, is conveyed into an inlet for simultaneous comminution and reaction. The chemical reaction of the solid matter may be based upon several variables such as, the solid matter's chemical composition, the fluid used in the plasma torches, the temperature of the reactor and the flow rates of the solid matter and the fluid. For example, if water or steam is used as the fluid in the plasma torch and the solid waste is coal, the end reaction maybe ash, hydrogen and carbon monoxide, hydrogen sulfide, chlorine and other contaminants. However, if carbon dioxide is used as the plasma torch fluid and the solid waste is carbon or coke, the end reaction may be ash and carbon monoxide. The carbon monoxide may be reformed with steam in the water gas shift reaction to produce hydrogen and carbon dioxide or may be used or sold as a chemical feedstock. The products of the reaction are flowed to an outlet for further treatment such as in a scrubber, amine unit for removing $CO_2$ or for direct use. If $CO_2$ is captured in an amine unit the $CO_2$ can be recycled back into the plasma torch.

It will be understood that the present invention can utilize a typical cyclone separator as the shell or reactor vessel. In this embodiment of the present invention, the Plasma Jet Vortex Mill Reactor, also allows for separation of the ash or solid particulate matter from the gases (hydrogen, carbon monoxide, carbon dioxide). This occurs in one stage or vessel.

The present invention comprises a novel method for comminuting and chemically converting a solid carbon source into a chemical feedstock or fuel in one reaction vessel. Additionally, the present invention also provides a novel method for comminuting, reacting or converting, and separating a solid carbon source into a chemical feedstock or fuel and ash byproduct in one reaction vessel. Pretreatment of the coke, coal or carbon sources is not necessary. Dewatering is not necessary if the reactor is operated in a steam reforming mode.

The present invention can advantageously used as a skid or trailer mounted modular plasma reactor, having a relatively small footprint yet it can effectively comminute, react and separate a very large volume of material at extremely high flow-rates. For example, again referring to FIG. 1, by installing a plurality of plasmas torches (eight (8) will be used in this example), such as Westinghouse Plasma Corporation's MARC-11 plasma torch, which are aligned tangentially, then the Plasma Jet Vortex Mill Reactor may be capable of treating extremely large volumes of waste. It will be understood that more or less than 8 torches can be used to obtain the desired comminution and chemical reaction or conversion.

The treatment rate calculated for using eight (8) Westinghouse Plasma Corporation's Torches in the present invention for MSW and ASR can range from 230 to 5,760 tons per day. These figures are based upon the nominal power of 300 kW-3,000 kW for the MARC-11 plasma torch in addition to the tests conducted for gasification of MSW and ASR. For MSW and ASR, the plasma torch power ranges from 100 kW to 250 kW per ton/hour.

The novel plasma jet vortex mill reactor of the present invention provides a viable solution for handling solid waste matter problems. For example, large volumes of solid waste matter are produced in oil & gas exploration, petroleum refineries, coal burning power plants, alumina plants, landfills, automobile shredding facilities, pulp and paper mills, and sugar mills. The waste matter from these facilities vary in particle size and chemical composition. Examples of the waste matter are drill cuttings, petroleum coke, coal fines/unburned carbon on flyash, red mud, MSW, ASR, wood chips/bark, and bagasse.

Normally, petroleum refineries have at least two delayed cokers for cracking the resid to coke and light ends. This allows cutting of the coke in the filled coke drum while the other coke drum is in operation. This process flow design allows for continuous operation of the refinery. In the present invention, the cut petroleum coke can be conveyed directly to the Plasma Jet Vortex Mill Reactor without having to be stockpiled or stored. Additionally, the Plasma Whirl Comminution Reactor can be operated with steam to produce syngas for use in the refinery.

Figure 2:
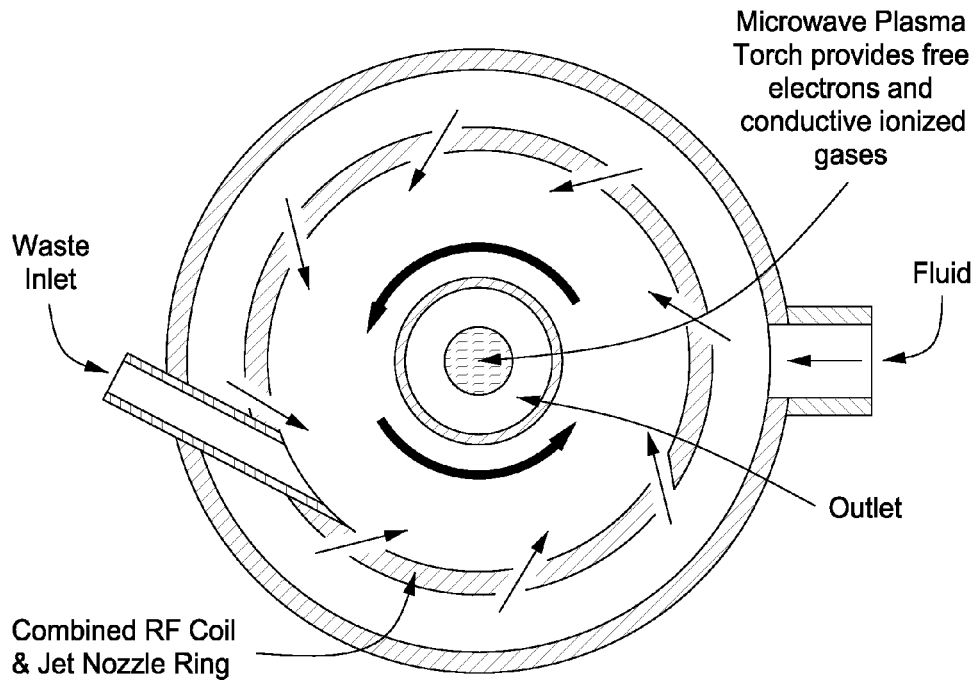
FIG. 2 is a diagrammatic, cross-sectional top view of a second embodiment Hyper Plasma Jet Vortex Mill Reactor.

Turning now to FIG. 2, a Hyper Plasma Jet Vortex Mill Reactor is shown. The Plasma Torch, such as a Microwave Driven Plasma Torch, provides free electrons and conductive ionized gases to the reactor. Microwave Driven Plasma Torches (MIDJet™) are available from Physical Sciences, Inc. (PSI) of Andover, Mass. PSI's MIDJet™ is a microwave plasma torch that has no electrodes to wear out. A comminution fluid is conveyed into and enters the reactor via a combined radio frequency (RF) Coil and jet nozzle ring. Although shown as a combined unit, it will be understood that the RF Coil may be separate from the jet nozzle ring. The jets are arranged tangentially or in a means so as to initially start and preferably maintain a vortex. This elongates and constricts the plasma from the MIDJet™. When an AC current is applied to the RF Coils the microwave plasma volume increases dramatically. The rapid expansion of the plasma volume increases velocity. Thus, the initial angular velocity is dramatically increased which immensely increases angular momentum within the reactor.

This imparts a novel, unobvious and very unique method for comminution, chemical reactions and separation. Since it is well known and well understood that plasma jets can obtain velocities greater than 3,000 meters/second with high energy densities, then the plasma jet can be converted to angular momentum and energy. Not being bound by theory, it is believed that as the RF coils increase the plasma volume the velocity will increase dramatically without an increase in fluid flow. It is also believed that by centrally locating a plasma source (microwave plasma torch), the centrally located plasma region will remain in an extremely highly activated state. This is so for several reasons. First, the vortex creates a central void or vacuum. Second, since in a vacuum the molecules will be farther apart thus, less collisions will occur. An electron beam can be used for creating the central ionized gas region in lieu of a microwave driven plasma torch. An ideal electron beam source for the present invention is a non-vacuum electron beam welder.

The highly activated ionized gas center allows for complete dissociation of all matter entering into it. The molecules, atoms or radicals with a mass low enough to enter into the central vacuum or "eye of the tornado" may be fully dissociated if a sufficient amount of energy is applied to the Hyper Plasma Jet Vortex Mill Reactor. Likewise, large and more dense particulate matter will be flung toward the outside of the vortex.

In kinetic energy comminution devices, such as a jet mill or fluid energy mill, a gas is used in combination with angular momentum to disintegrate particles into smaller particles. A jet mill uses stored potential energy to create angular momentum. Potential energy is stored within a compressed gas such as compressed air or steam. However, the compression stage occurs in a separate and distinct process/apparatus such as a boiler or compressor. It is well known that air compression is an inefficient means for storing energy. The jet mill is utilized for particle comminutation, disintegration or grinding.

Another device that takes advantage of angular momentum is a cyclone separator. Both the jet mill and cyclone separator are utilized for comminutation, drying and separating but not as a chemical reactor.

On the other hand, the present invention imparts angular momentum to particles within the reactor by means of increasing the plasma volume. In comparison, this would be akin to increasing fuel flow into a combustion turbine or any internal combustion engine. However, in contrast, the present invention's energy source is stored and transferred into the reactor via electrons and photons or quite simply wave energy. It is the wave energy that is the means for imparting a sufficient amount of angular momentum to the reactor and not simply just the gas flowing into the reactor.

In part, the novelty of the present invention leads to unexpected results due to the combined effects of a jet mill with that of a plasma torch. It is unexpected that a plasma torch in combination with another plasma generation device, coupled to impart angular momentum in a vessel, allows for a reduction in the flow rate of the jet fluid. This unexpected combination can be explained as follows:

1. An initial wave energy generating means provides wave energy to the reactor.
2. At least one other wave energy generating means is used to increase angular momentum within the reactor.
3. As the second wave energy generating means is energized the ionized gases increase in temperature.
4. Due to the increase in temperature the gases expand rapidly.
5. The increase in gas volume increases velocity.
6. Due to the design of the reactor, the plasma velocity is transferred into angular momentum. Thus angular momentum is increased within the vessel by not having to increase gas flow rate or solid flow rate to the reactor.

In essence, waste or fluid flow rate to the vessel can be stopped or recycled using valves or any other suitable means and the reactor can be operated similar to a giant light bulb or continuous recycling reactor. This "giant light bulb" mode of operation would be a closed loop operation.

Another unexpected result of the present invention is the ease of controlling the reactor via electronics. This is contrasted to the difficulties in controlling modern day jet mills, pyrolysis, gasification, reforming and cracking reactors, and cyclone separators via fluid flow. The speed at which the present invention can be controlled is the speed of wave energy. By utilizing solid-state power supplies and microwaves the speed of electrons and the speed of microwave photons (speed of light in an atmosphere) are used. Current modern day practices utilize valves that may be electronically controlled and actuated, but the sealing or throttling device operates mechanically. This will best be explained in a gas flaring example.

Flaring waste gases is common in many industries. Flares may operate intermediately, all the time, automatically or with operator assistance. However, the flare ignition device, normally a pilot light, may operate continuously. This is similar to the pilot light on a gas stove or oven. The pilot light stays on all the time. When the gas valve for a burner on the stove is turned to the low, medium or high position, gas flows through the burners and is ignited by the pilot light.

In the present invention, as shown in FIG. 2, the MIDJet™ (microwave plasma torch) or the wave energy source, acts similar to a pilot light. The gas or fluid for the plasma torch can be steam, VOCs, $CO_2$, air, oxygen, hydrogen, nitrogen or any other fluid capable of being ionized and forming a plasma. If the wave energy source is an electron beam then a fluid is not necessary. Simply a stream of electrons acts as the pilot light. In the event of a plant upset, when VOCs or any other fluid is flowed to the reactor, the RF field is energized or more energy is applied to the RF Coil. The reactor can be designed to operate similarly to an electric motor in which as the load or torque increases on the motor's shaft more electricity is flowed through the windings to increase torque. It will be understood that many variations and automated control schemes can be utilized to automate the reactor. Some of the parameters that can be monitored to automate the reactor are temperature, flow rate, valve position, amps, volts, etc.

Figure 3:
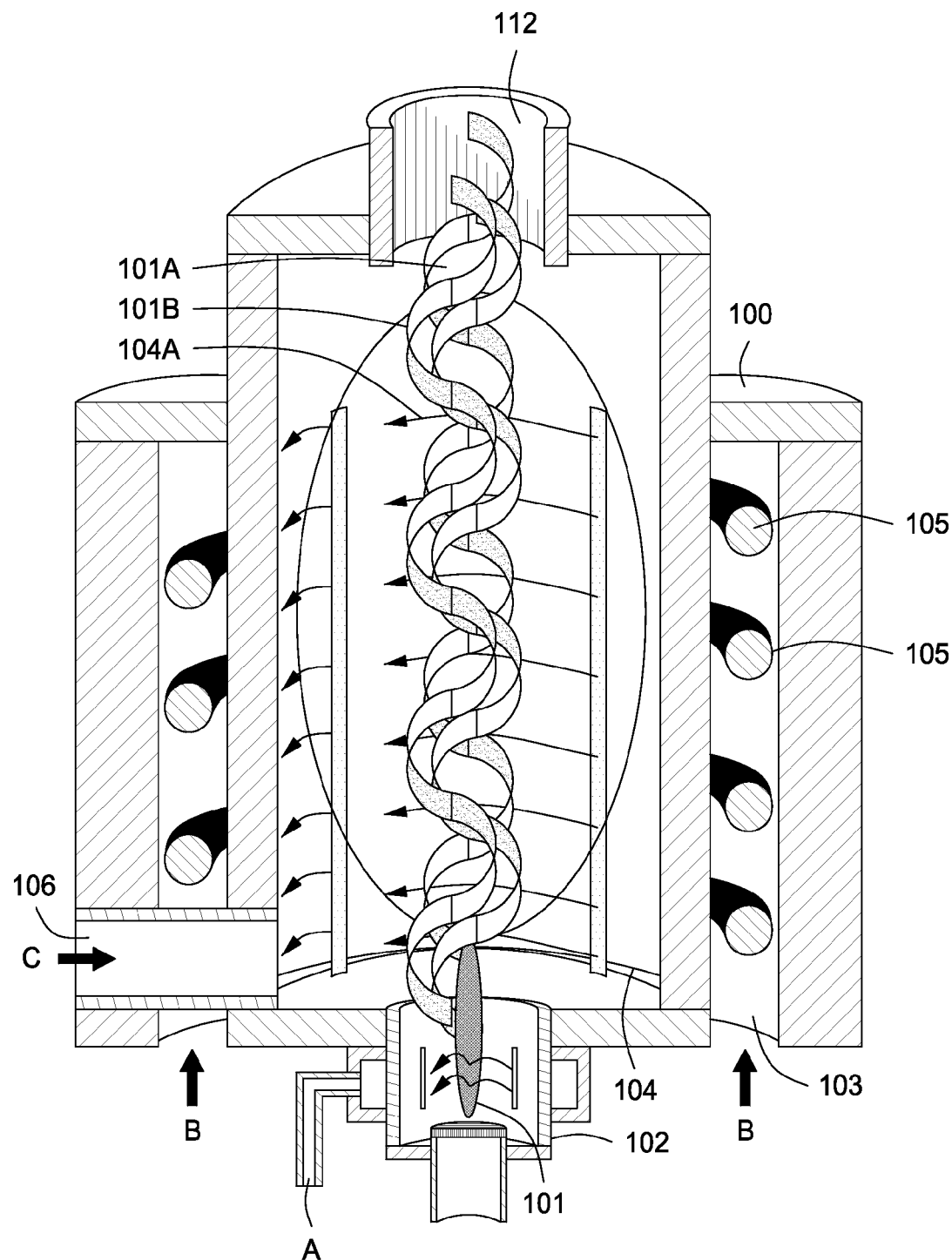
FIG. 3 is a diagrammatic, cross-sectional side view of a third embodiment Plasma Whirl Reactor.

FIG. 3 is a representation of a Plasma Whirl Reactor of the present invention that illustrates the whirls that will be present in such a reactor and helps one with understanding the advantages of the present invention's plasma whirl reactor over conventional plasma systems. In comparison and contrast to a plasma whirl and to better understand "whirl" flow, an explanation of fire whirls can be found in the following publications from the U.S. Dept. of Commerce Technology Administration, National Institute of Standards and Technology (NIST): (1) NISTIR 6341 "Simulating Fire Whirls," (2) NISTIR6427 "The Fluid Dynamics of Whirls—An Inviscid Model," and (3) US Today Newspaper, Jun. 24, 2002 issue.

In order to demonstrate the wide variety of uses for the present invention, some of the figures hereof will be described in various preferred applications. For example, flares and solids found in the Oil & Gas Industry and biogas and MSW found at landfills. However, it will be understood that the present invention can be applied to many different applications in various industries. In addition, the present invention will be demonstrated in both cracking and reforming modes. Likewise, the present invention will be demonstrated in a carbon sequestration mode, which in turn allows for the production of a relatively clean hydrogen stream.

Turning again to FIG. 3 hereof there is illustrated a Plasma Whirl Reactor 100 that is comprised of a pilot plasma 101, the pilot plasma elongated, constricted and whirled 101A along the longitudinal axis and the plasma volume increased radially 101B. A first wave energy source 102 generates the pilot plasma 101 and the second plasma 101B is generated by a second wave energy generation means 105, such as a Radio Frequency (RF) induction coil.

A fluid B, such as flare gas, enters reactor 100 through inlet 103. The flare gas or fluid B then flows through a serious of jets or slits 104 which are coupled to the reactor in a way to impart angular momentum 104A to pilot plasma 101. RF coils 105 may be energized before, during or after the entry of the flare gas or fluid B into the reactor 100.

Next, several unsuspected but highly desirable results can occur. For example, angular momentum or the velocity of the whirl 104A is increased due to adding potential energy in the form of electromagnetic radiation energy (photons or electrons) via the RF coils 105. Thus, fluid B flow does not need to be increased to increase angular momentum 104A as is common with jet energy mills. Also, the plasma volume increases dramatically due to forming the second plasma 101B. However, the angular momentum and/or whirl 104A effects the pilot plasma 101A by constricting it radially while increasing its length along the longitudinal axis of the reactor 100. This sequence of events is demonstrated in FIGS. 3A, 3B and 3C hereof.

Figure 3A:
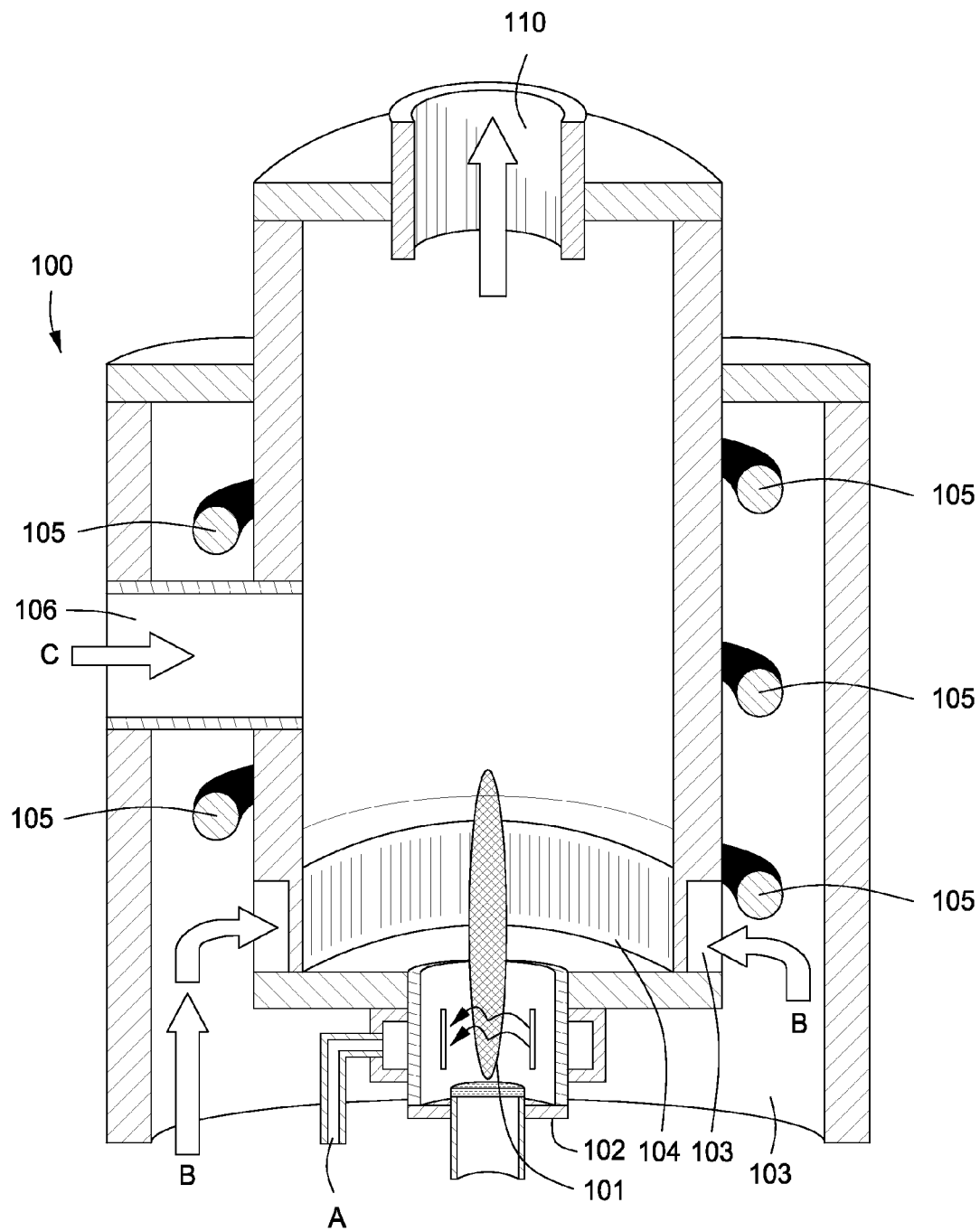
FIGS. 3A, 3B and 3C are diagrammatic, cross-sectional side views of an embodiment Plasma Whirl Reactor illustrating the sequence for forming a Plasma Whirl.

In FIG. 3A, in lieu of using slits or jets, a squirrel cage fan 104 is utilized for imparting angular momentum or whirl 104A to reactor 100. Squirrel cage fan 104 is fixed in place (does not rotate) by any known attachment means, such as bolting, rivoting, welding, gluing, clamping, etc. Reactor 100 may be fabricated such that the squirrel cage fan 104 is an integral part of reactor 100. This can be accomplished by machining, or molding, squirrel cage fan 104 as a part of reactor 100. Fluid B flows into inlet 103, which in this case is the annulus between the reactor wall and a refractory/EMR permeable wall 100A. Squirrel cage fan 104 in the present invention operates opposite that of a typical blower that incorporates a squirrel cage fan. The purpose of the squirrel cage fan, jets, slits, nozzles or louvers 104 is to impart initial angular momentum 104A within reaction chamber 100B.

Figure 3B:
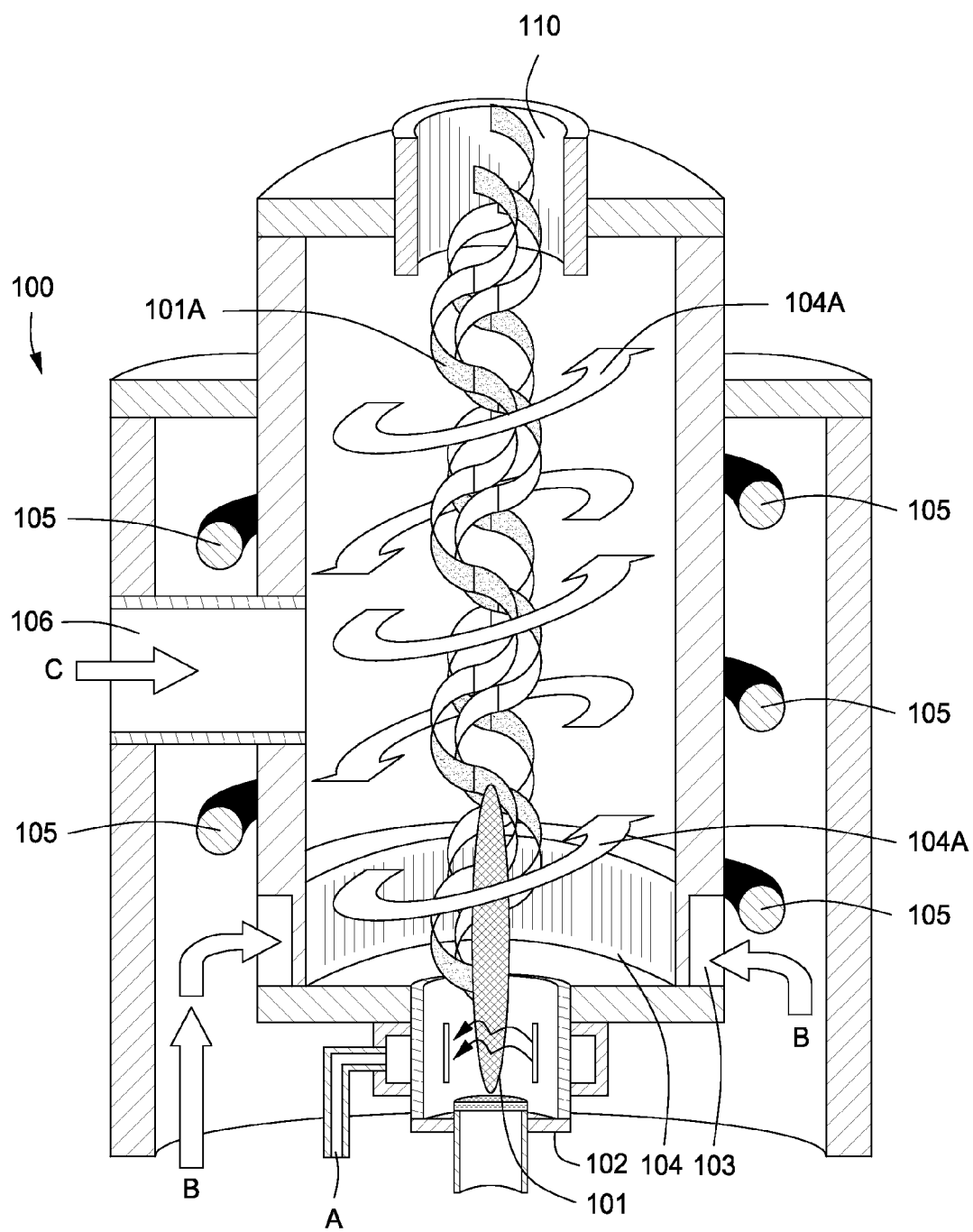

In FIG. 3B when the flare gas or fluid B flows through squirrel cage fan 104 angular momentum 104A is created and imparts a desirable quality to the pilot plasma 101. Due to the angular momentum and whirl 104A pilot plasma 101 is now stretched and constricted into an elongated whirl plasma 101A along the longitudinal axis of reactor 100.

Figure 3C:
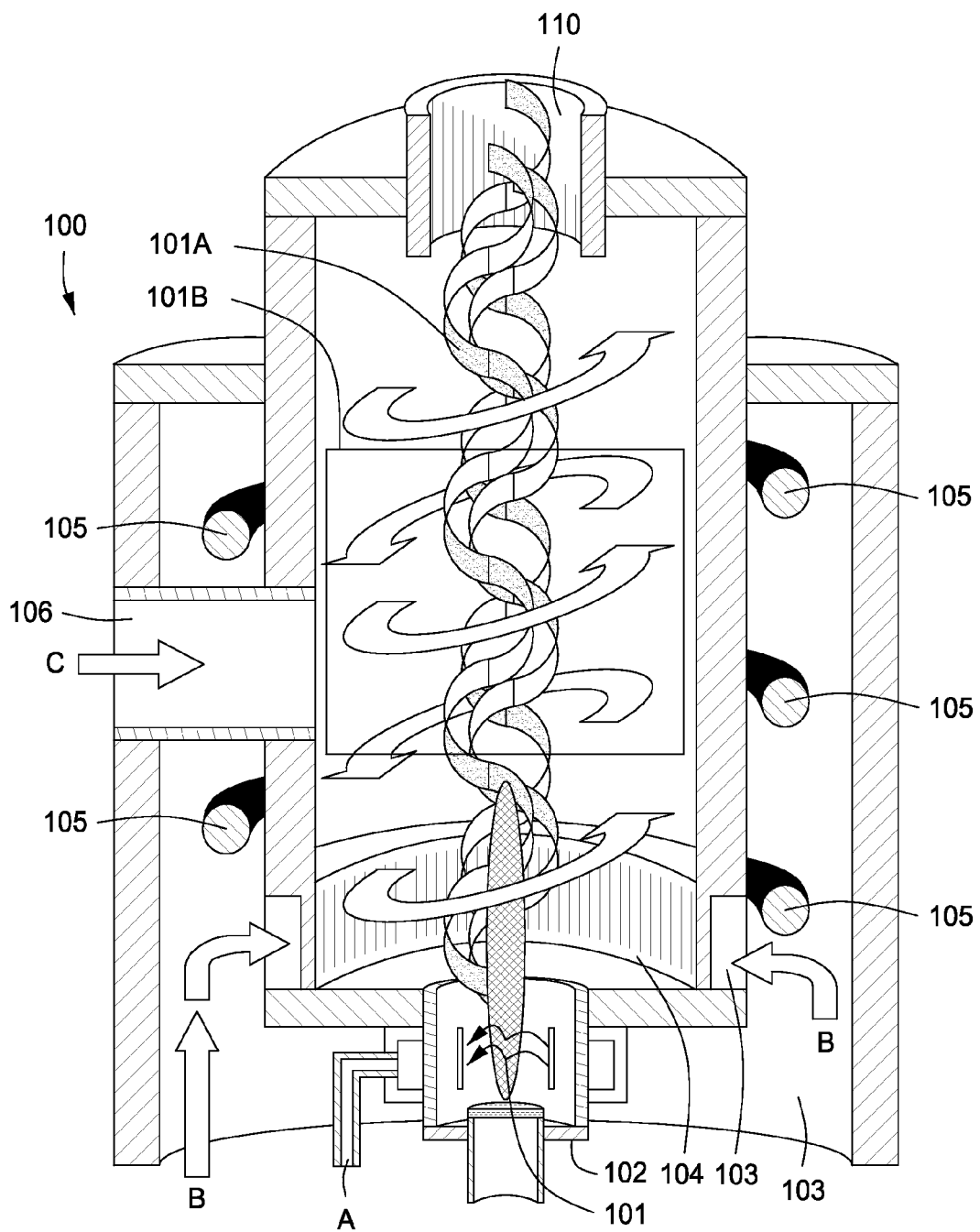

In FIG. 3C when RF coils 105 are energized the plasma volume increases radially to form a very large plasma 101B. Once again the unexpected but extremely desirable quality of an increase in angular momentum is imparted to reactor 100.

This additional attribute performs several functions with unexpected results. Again referring to FIG. 3C a second fluent material C enters the reactor via inlet 106. Due to angular momentum and whirl 104A in combination with centrifugal force the fluent material is comminuted by particle to particle collisions, heat and the high velocity plasma. In addition, the secondary large plasma 101B provides heat, wave energy, radicals and ions for chemically reacting reactants into products.

Not being bound by theory, it is also believed that the Plasma Whirl Reactor of the present invention can be used to separate materials as well as to increase residence time within the reactor 100 for particulate matter. Dense particulate matter is separated from less dense matter, such as light gases (hydrogen) due to angular momentum 104A which forms centrifugal force within the reactor 100. The less dense matter may be entrained within the elongated pilot plasma 101A. The dense matter is entrained within the peripheral of the large plasma 101B. The reactor can be designed such that the all matter exiting the reactor must pass through the elongated pilot plasma 101A.

Another unexpected but desirable result occurs when outlet E and reactor 100 are modified in size and shape to resemble a cone, cyclone separator or jet mill. By referring to FIGS. 1, 2, 4, 5, 6, 6A, 7, and 7A the reactor may be constructed similar to a cyclone separator and/or a jet energy mill. This attribute performs several functions with unexpected results. It should be noted that the terms "matter" and "particulate matter" as used herein refers to particles, ions, atoms, molecules and elements in solid, liquid, gas or plasma states. Once again, not being bound by theory, it is believed that more dense matter will remain in the outer portion of the whirl, while less dense matter will remain within the central vortex of the plasma whirl. Thus, matter of different densities can be separated from the main flow via the vortex by designing the reactor similar to a cyclone separator.

The plasma whirl reactor of the present invention can easily replace a flare to achieve zero emissions, discharges or releases. For example, during upsets in a refinery or petrochemical plant an operator may, send a feedstock stream, such as methane to a flare. However, if the present inventions plasma whirl reactor were in place, the operator would have an alternative to flaring and releasing emissions to the atmosphere.

The Plasma Whirl Reactor of the present invention can easily be configured for intermittent operations such as replacing a flare. First, pilot plasma source 102 can be an extremely low powered source. One example is a 6 kW MIDJet™. Another example is a lower powered non-transferred arc plasma cutting torch. The plasma carrier gas may be selected from steam, $CO_2$, air, oxygen, nitrogen, hydrogen, helium, VOCs or any other gas capable of being ionized. For the sake of simplicity since many flares are steam assisted, then steam will be used in the following example.

The Plasma Whirl Reactor of the present invention may be operated in a cracking mode, by increasing or turning on power to RF coils 105. Since pilot plasma 101 is already formed, by energizing coils 105, this will form the large plasma volume 101B. As soon as the feedstock from the plant upset flows into inlet 103 and through jets 104, several processes occur simultaneously. First, angular momentum increases. This forms the elongated pilot plasma 101A. Second, the hydrocarbon (HC) feedstock, such as methane or an ethane/propane mix, commonly used for ethylene production, is cracked into hydrogen and carbon provided that the feedstock flow B is far greater than the steam flow A into pilot plasma torch 102 which produces the pilot plasma 101. It will be understood that pilot plasma 101 may utilize the HC as carrier gas A in lieu of steam.

Figure 6:
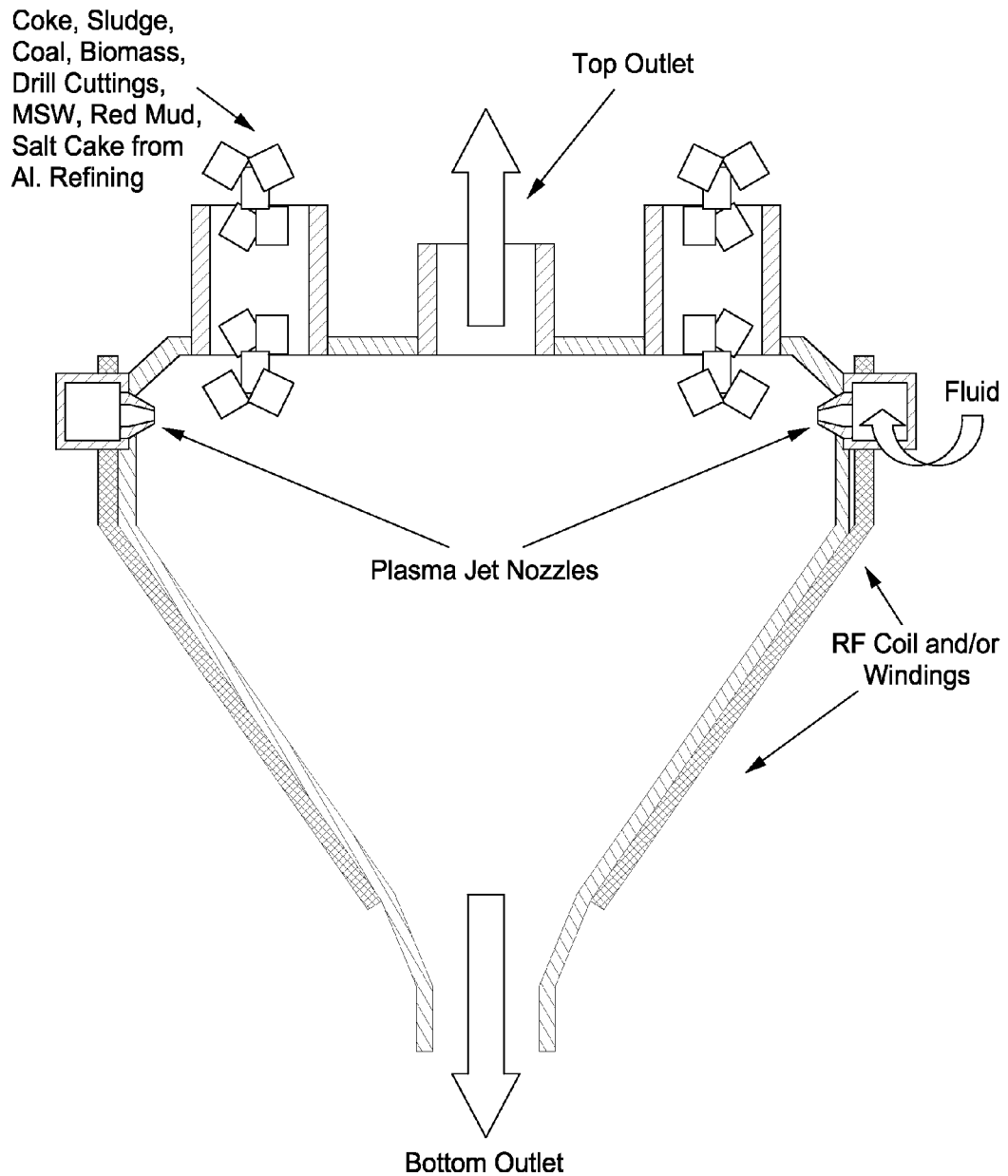
FIG. 6 is a diagrammatic, cross-sectional side view of a sixth embodiment Hyper Plasma Jet Cyclone Separator Reactor.
Figure 6A:
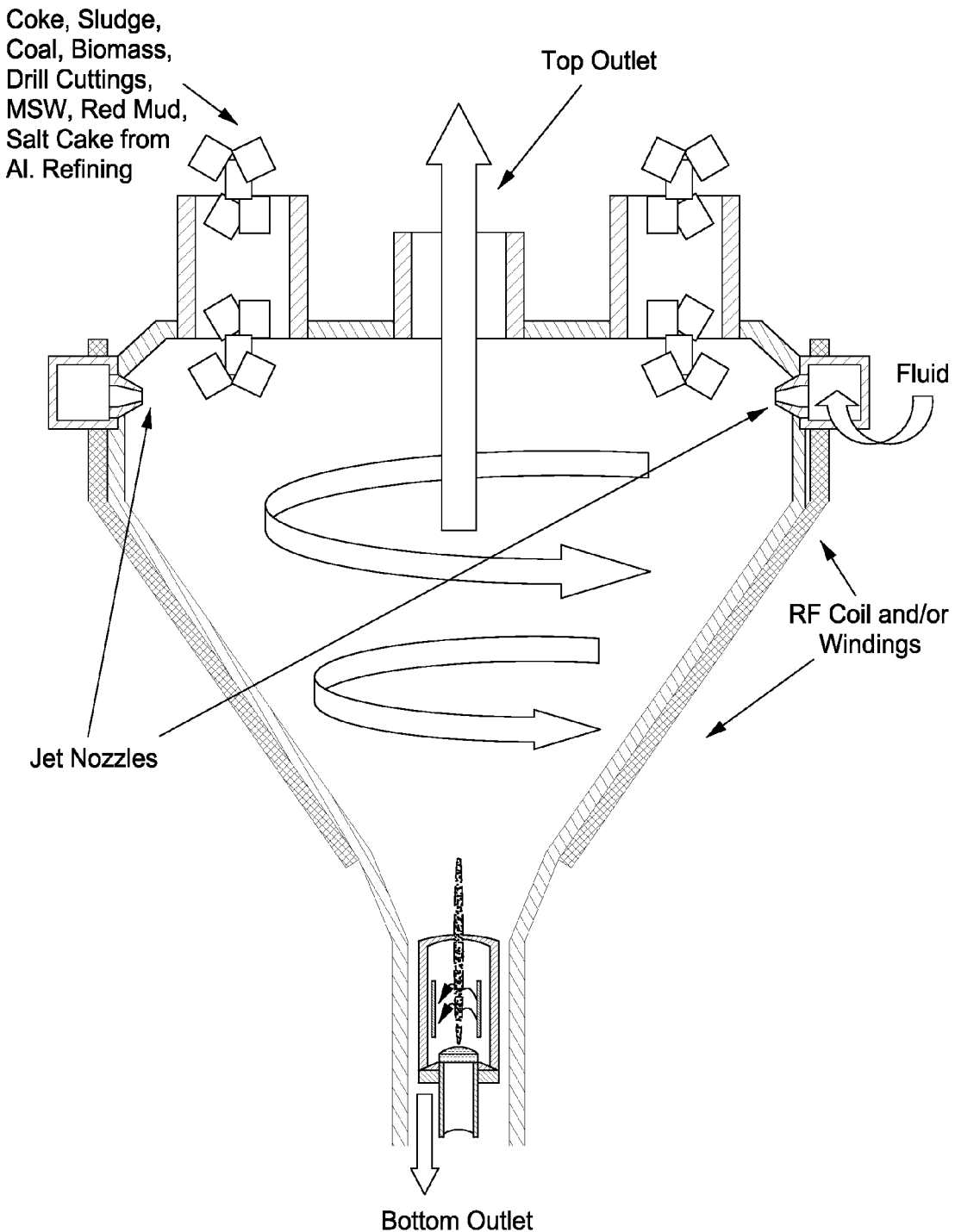
FIG. 6A is a diagrammatic, cross-sectional side view of another embodiment Hyper Plasma Jet Cyclone Separator Reactor.

It is believed that the cracked products, hydrogen and carbon can easily be separated from each other, by designing the Plasma Whirl Reactor similar to that represented in FIG. 6A hereof. The lighter hydrogen will remain in the central vortex while the carbon will be forced to the outside of the whirl. The hydrogen can exit the reactor via a top outlet while the carbon exits via a bottom outlet. It will be understood that a pilot electron beam can be used in lieu of the pilot plasma torch. Thus this would eliminate carrier gas A.

The Plasma Whirl Reactor of the present invention can be immediately switched to a $CO_2$ reformer for the production of syngas. Referring back to FIG. 3 hereof, if the plant desires to produce syngas in lieu of hydrogen and carbon, the operator can flow $CO_2$ into reactor 100 via inlet 110. It will be understood that the $CO_2$ can be premixed with feedstock stream 103, prior to entry into reactor 100. A plant that has a large $CO_2$ point source emission such as an ethylene oxide plant can utilize the $CO_2$ in the present invention for production of syngas. The syngas can then be transferred via pipeline to a nearby refinery of chemical plant for use as a chemical feedstock. The use of the present invention in this application eliminates the $CO_2$ emission at an ethylene oxide plant. If the Plasma Whirl Reactor is operated at a temperature greater than 1000° C., the $CO_2$ reforming reaction is exothermic. Thus, any refinery or industry in dire need of hydrogen can utilize any HC stream to efficiently produce hydrogen with the present invention's Plasma Whirl Reactor.

As previously stated, the Plasma Whirl Reactor of the present invention can be configured in accordance with FIGS. 1 through 7A hereof or in any manner that will provide a source for an ionized gas that provides a means for angular momentum. The product from the chemical reaction of the reactants in the Plasma Whirl Reactor of the present invention can be further scrubbed or purified in accordance with FIG. 8 hereof.

Figure 8:
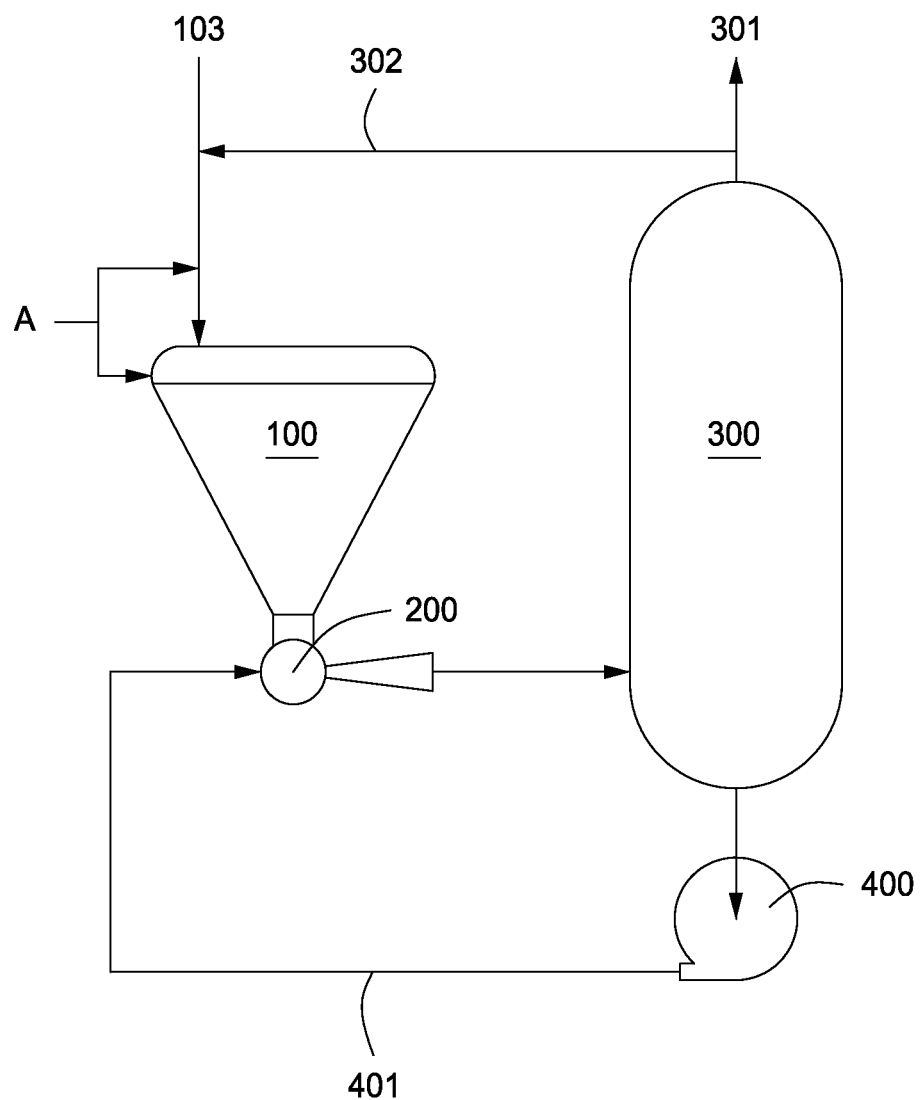
FIG. 8 is a diagrammatic, process flow of an embodiment Plasma Jet Mill Eductor & Scrubber/Quencher.

Referring to FIG. 8 hereof, the syngas produced from plasma whirl reactor 100 is conveyed into eductor 200 by means of suction provided by a quenching fluid that flows into a quench/scrubbing tower 300. The quenching/scrubbing fluid may be selected from the group consisting of water, amines, emulsions, hydrocarbons, organic fluids, caustic soda, calcium oxide, red mud, and any fluid that will quench and scrub the syngas. Pressurized fluid is provided to eductor 200 by means of a pump or compressor 400 via pipe 401.

The novelty, usefulness, and unobviousness of the present invention will be demonstrated in another example. Drill cuttings are the soil that is removed when a hole is bored into the ground during oil & gas well drilling operations. Currently, the drill cuttings are separated from the drilling mud with a shale shaker or other means known in the industry. Likewise, entrained gases within the drilling mud are separated from the solution with a degasser. These, two emission sources must be handled in a safe and environmentally sound manner. Most drill cuttings end up being pumped down an injection well. Gases from the degasser are usually flared. Drilling rigs normally use diesel engines and diesel generators. Diesel exhaust is another release that is regulated and must be dealt with. Another release, or waste, is the sludge produced from the Dissolved Air Floatation (DAF) unit. Currently, the solid wastes in particularly the drill cuttings are stored on the rig in cutting boxes. Cutting boxes take up valuable space and are also an additional leased expense. The cuttings are conveyed to a supply boat for transportation to a shore facility. At the dock, a crew will add water to the cuttings in order to pump it out of the storage tank. Next, the crew washes out the tank. The drill cutting solution is taken to an injection well facility for final disposal into a geological formation.

Figure 5:
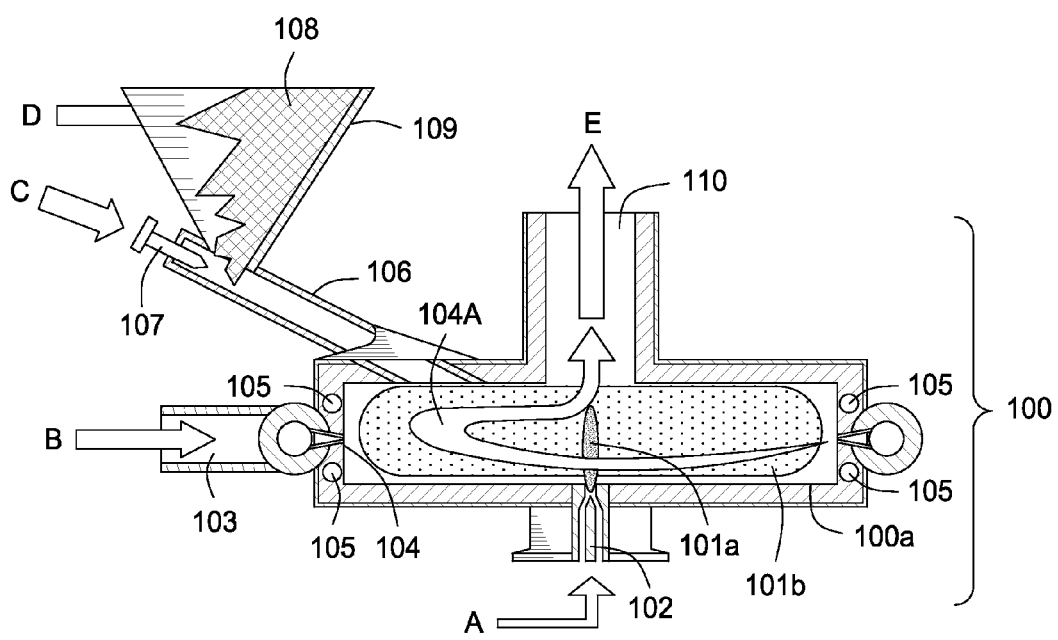
FIG. 5 is a diagrammatic, cross-sectional side view of a fifth embodiment Plasma Fluid Energy Mill Reactor.
Figure 10:
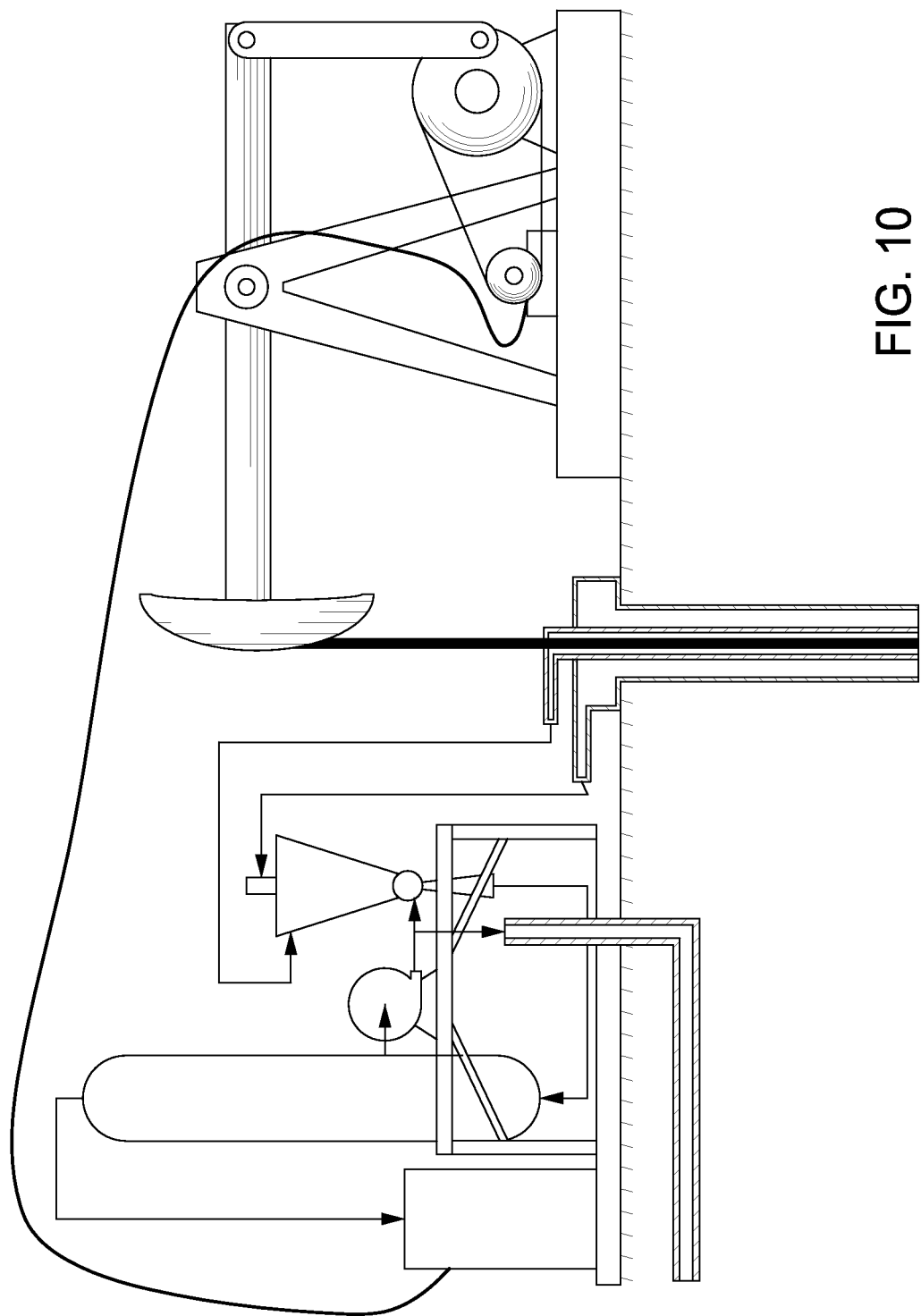
FIG. 10 is an illustration of an embodiment for Onsite Rig/Pad Flare Elimination, Diesel Emissions Treatment and Drill Cuttings Conversion to Flyash with a Plasma Whirl Reactor.

The present invention eliminates the problems associated with drill cuttings. The present invention provides a solution onsite at the shale shaker. FIG. 5 hereof is a representation of a Plasma Fluid energy Mill Reactor of the present invention. Reactor 100 is located near the shale shaker as shown in FIG. 10 hereof in order for cuttings to be fed directly into hopper feed system 107 as shown in this FIG. 5. It will be understood that any type of feed system can be used to convey the cuttings into the reactor 100.

Once again, the Plasma Whirl Reactor of the present invention may be operated in an intermittent or continuous mode on a drilling rig. Referring to FIG. 5 hereof, pilot plasma 101A, or wave energy, is generated with plasma source 102 or electron beam. Any gas on the drilling rig may be used as carrier gas A for plasma source 102. Steam produced by recovering heat from the reactor 100 will be used as the carrier gas A for the pilot plasma in the following example.

Referring to both FIGS. 5 and 10 hereof, diesel exhaust B from the diesel generators or diesel pumps is conveyed into reactor 100 and flowed into jets 104 which are fluidly coupled to inlet 103. RF coils 105 are energized to increase the plasma volume, temperature and angular momentum. At this point, diesel exhaust emissions B are also being treated for nitrogen oxide contaminants. It will be understood that steam or any other fluid may be flowed into inlet 103 in lieu of diesel or gas turbine exhaust.

When the degasser removes gases entrained within the drilling mud and cuttings without any operator input, the degasser gas C flows to inlet 107 instead of to a flare. Inlet 107 may be a venturi-jet nozzle. As drill cuttings 108 fill hopper 109, the cuttings 108 are removed from the hopper via a venturi eductor or inlet 106 that conveys the motive gas C and cuttings 108 into the reactor. Steam or an inert gas D may be used to provide a gas blanket on the drill cuttings within hopper 109. The hopper 109 is not necessary if another storage and conveyance means are available on the oil rig.

Once again, the reactor can be operated in a cracking or reforming mode based on the nature of fluid B. It will be understood that reactor 100 may be constructed in a flat pancake style fluid energy mill such as FIGS. 4 and 5 hereof, or shaped similar to a cyclone separator such as in FIGS. 6, 6A, 7, 7A and 8 hereof.

The cuttings will be comminuted, dried and converted into fly-ash upon entry into reactor 100. Organics, such as diesel, drilling fluids, etc. will be cracked or reformed to hydrogen, carbon monoxide, hydrogen sulfide and nitrogen. Likewise, diesel exhaust may be reformed provided enough organics are present within reactor 100. The water vapor and carbon dioxide present in the diesel exhaust will provide the source of oxygen to form syngas. The syngas can then be used on the rig as a fuel or piped and sent to downstream production facilities. Thus, the present invention has provided a novel method for eliminating flares on drilling rigs while simultaneously converting drill cuttings to flyash while also treating the rig's diesel exhaust emissions.

FIG. 6A hereof represents another mode of operation of the present invention that can be utilized to produce a substantially pure stream of hydrogen using only one reactor. A carbon source is combined with calcium oxide and fed into the reactor. The fluid entering into the jet nozzles that will provide the initial angular momentum is steam. Likewise, steam is used as the carrier gas for the pilot plasma torch. Process efficiency can be enhanced by slaking the lime with water that is entrained within the drill cuttings. This will add energy in the form of heat to the reactor from the combination of Calcium Oxide with water.

The following processes are now synergistically combined within a single vessel of the present invention:
(1) the reactor comminutes the carbon matter and calcium oxide.
(2) the plasma dissociates and reforms the steam into hydrogen and atomic oxygen.
(3) the calcium oxide reacts with carbon and atomic oxygen to form calcium carbonate.
(4) the remaining calcium oxide reacts with other contaminants such as sulfur and chlorine to form for example solid calcium sulfate and calcium chloride respectively.
(5) the carbonate, sulfate and chloride solids exit through the bottom outlet while the pure hydrogen exits through the top outlet.

Onboard a drilling rig or land based drilling pad, the substantially pure hydrogen can be used in a fuel cell to provide electricity to the rig while obtaining zero emissions. This effectively eliminates diesel emissions. Likewise, if methane or any carbon source such as diesel or solid waste is present onboard the rig a pure hydrogen stream can be produced for use as fuel or a chemical feedstock. It will be understood that this invention can easily be practiced with coal or petroleum coke as the source of carbon. The present invention can also use raw crude oil for production of hydrogen.

The present invention can be operated in a vitrification mode for treating drill cutting piles that are located below production platforms. Since the apparatus of the present invention is relatively small, it can easily be attached to a Remotely Operated Underwater Vehicle (ROV). Electrical leads for operation of the EMR power supplies can be tethered from the rig or a ship to the Plasma Whirl Reactor and ROV. The Plasma Whirl Reactor can include a small boiler that will produce steam by means of an electric heating element. The steam can then be used for the microwave pilot plasma. Drill cuttings could be conveyed to the unit with an auger, dredge cutting head assembly or pump. The cuttings can be pumped into the reactor and allowed to melt and flow out of the reactor back into the seawater. Upon being quenched, the molten solution immediately vitrifies, thus encapsulating heavy metals.

Figure 4:
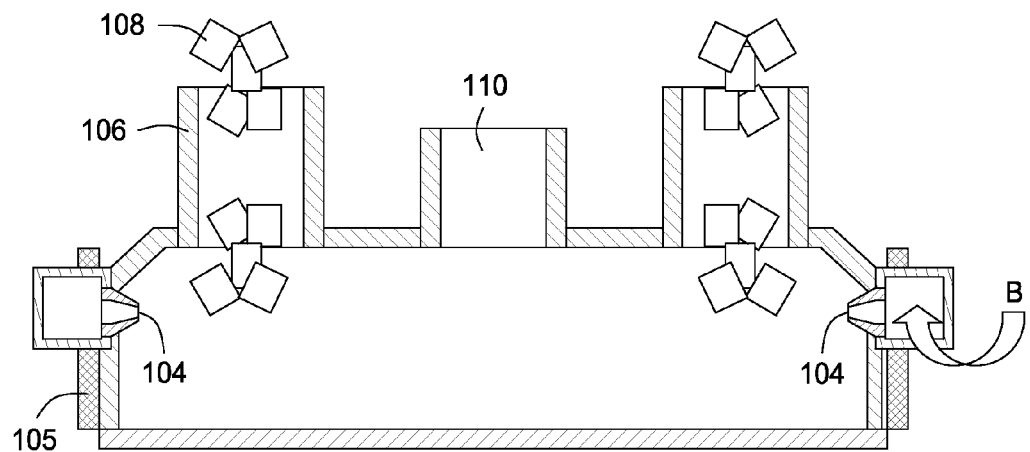
FIG. 4 is a diagrammatic, cross-sectional side view of a fourth embodiment Plasma Jet Pancake Mill Reactor.

API Separators and Dissolved Air Floatation Units produce oily waste and sludges. By use of the present invention, it is not necessary to further treat the oily waste or sludge. The oily waste or sludge, can be conveyed into reactor 100 as shown in FIG. 5 hereof, via hopper 109. In another mode illustrated in FIG. 6A hereof, the oily waste can be the fluid for creating the initial cyclone. Or referring to FIG. 4 hereof and comparing it to FIG. 1 hereof, plasma torches are aligned tangentially to impart angular momentum within the reactor. The sludge or oily waste can be fed into an inlet located on the side of the reactor as shown in FIG. 1 hereof in which the reactor is designed to also perform as a cyclone separator. However, the sludge or oily waste may be fed from the top as shown in FIG. 4 hereof. FIG. 4 hereof also shows an RF coil in the reactor wherein the tangentially aligned plasma torches can be enhanced dramatically. It will be understood that the RF coil can be located on the top and bottom or just on the top of the reactors shown in FIGS. 1, 2, 4, and 5 hereof. For simplicity purposes, a typical winding cylindrical shaped RF coil is illustrated in the present invention.

The processing and production of valuable fuels from oil shale has not been economical in most parts of the world. First, the oil shale must be mined. Next, it is crushed then fed to a pyrolysis unit in which the kerogen is released from the oil shale as shale oil. The shale oil is then upgraded to useful hydrocarbon products. A benefit and unexpected result of practice of the present invention is that drill cuttings are finely comminuted and dried to a point wherein the fly-ash type material can be mixed as an additive into the cement that is used for cementing the well bore. Thus, most of the material from the well bore can go back into the well bore as part of the cement. The remainder can be transported to shore as a useful product, simply dumped overboard or used for weighing down pipelines by cementing the outside of the pipe.

The Plasma Comminution Reactor of the present invention solves many of the problems associated with mining and recovering valuable products from oil shale. For example, the modular and mobile Plasma Comminution Reactor can be located at the mining site. The mined oil shale is conveyed directly to the Plasma Comminution Reactor which can be operated to recover the oil from the shale, or simply to convert the oil to syngas. The solid waste produced from the reactor can be placed back into the mine. The syngas can be transported via pipeline to the end user. However, it will be understood that the syngas can be used onsite as a chemical feedstock or for the production of electricity.

Figure 11:
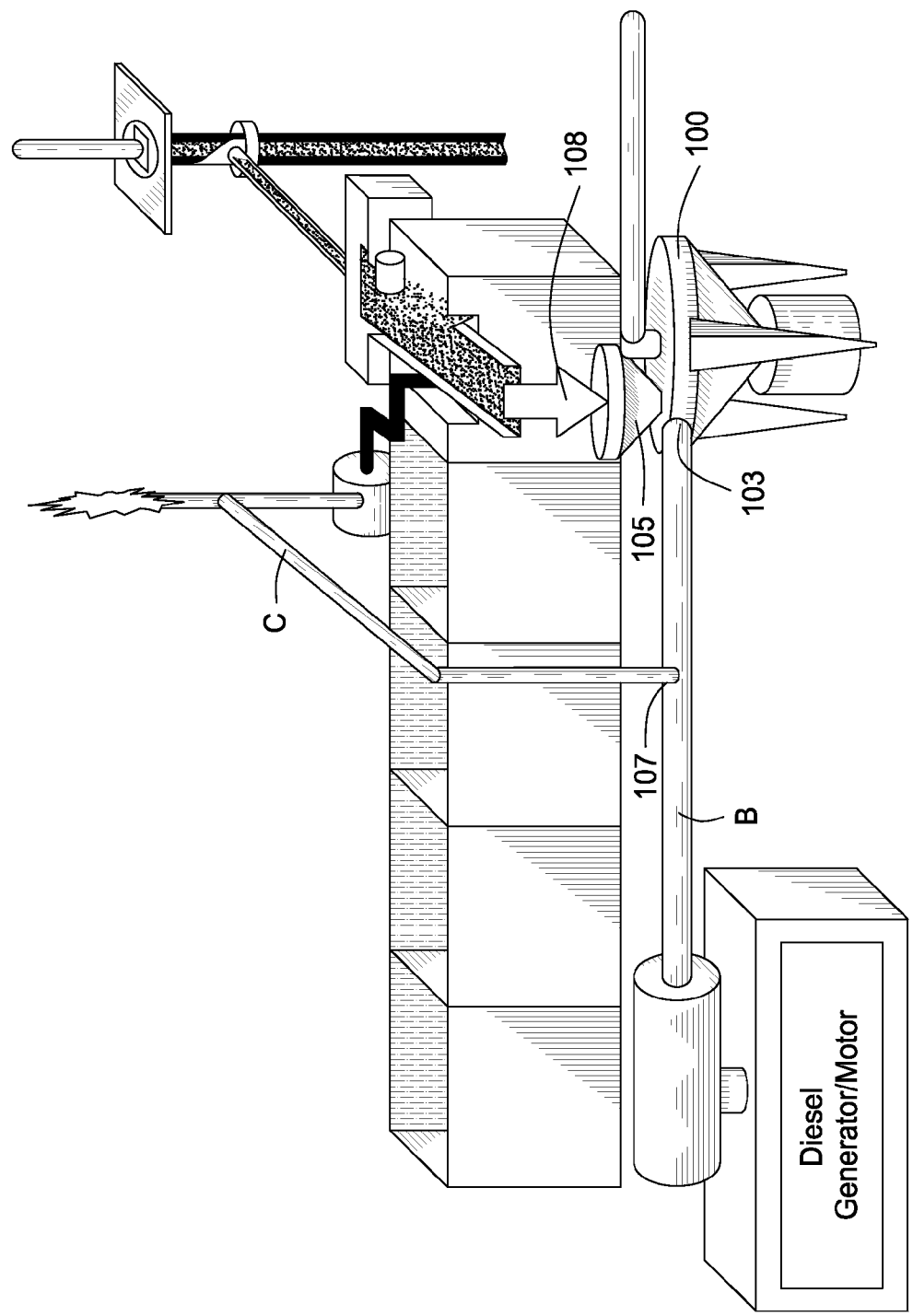
FIG. 11 is an illustration of an embodiment of the Plasma Whirl Reactor for Upgrading Crude at the Wellhead.
Figure 12:
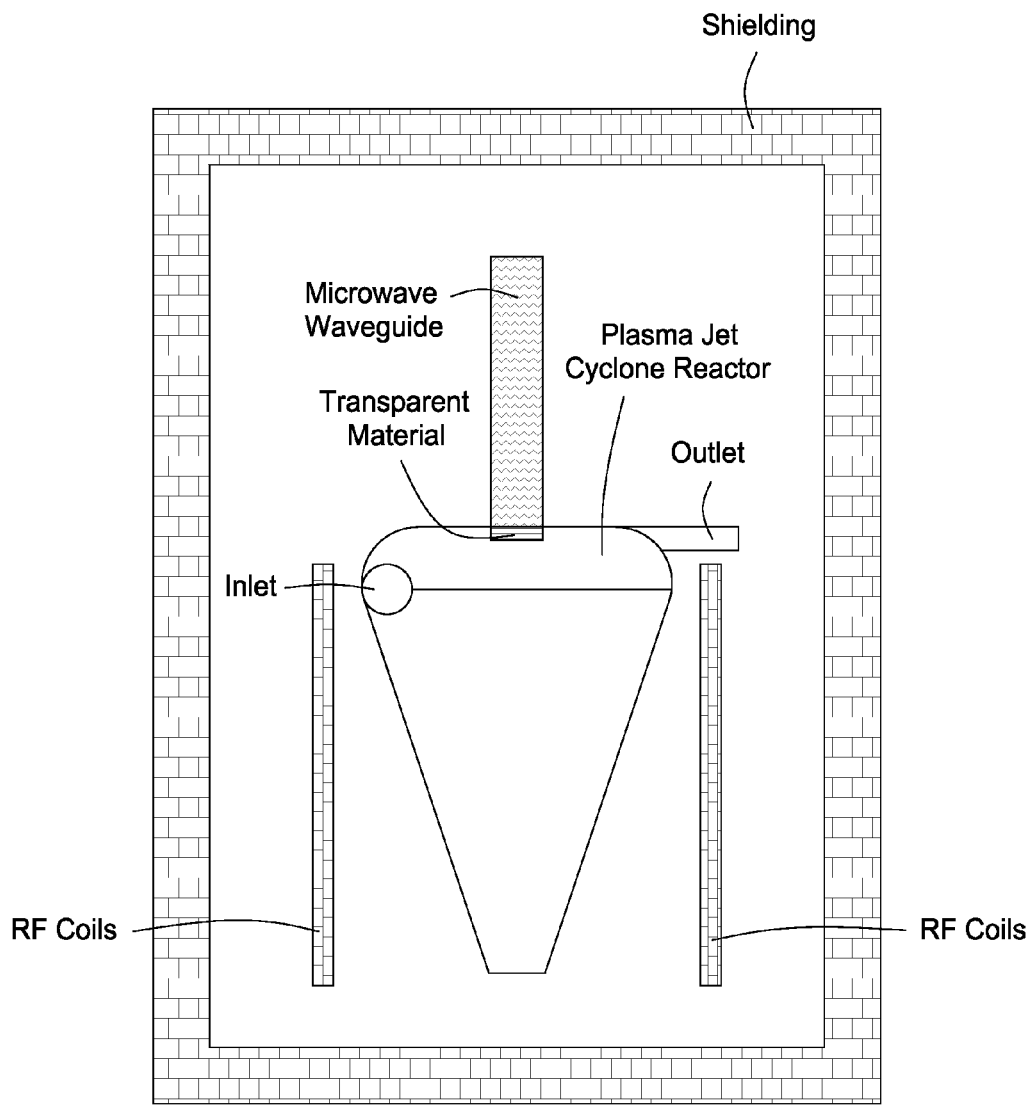
FIG. 12 is an illustration of an embodiment of a Plasma Whirl Reactor for Treating Radioactive Waste.
Figure 13:
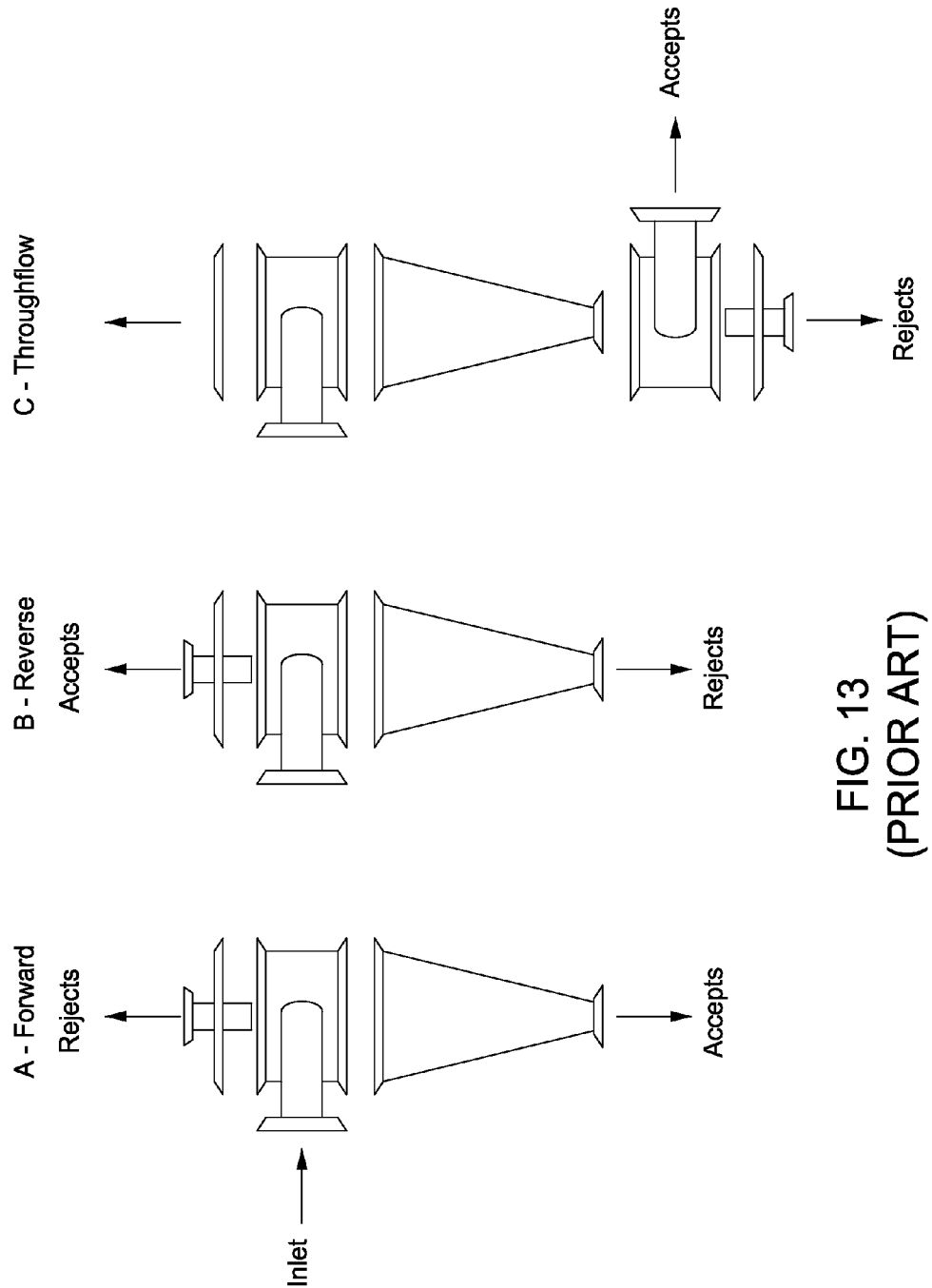
FIG. 13 illustrate various Hydrocyclones in accordance with the prior art.

The present invention provides a novel apparatus and process for upgrading crude at the wellhead. Referring to FIG. 11 hereof, there is provided a horse-head pumpjack 600 that pulls on a sucker rod 700 that is attached to a bottom-hole oil pump (not shown). Oil from the oil-bearing formation enters into the suction side of the pump and is discharged into tubing 800 that also encases sucker rod 700. However, during the pumping action gases trapped in the crude oil may be released into annulus 900. The crude oil flows up tubing 800 while the gases may flow up annulus 900. Due to piping and engineering designs the gas, which is more commonly called casing-head gas, can cause back-pressure on the well. The back-pressure can be compared to slowly closing a valve on a faucet. Simply, with a faucet the water flow decreases as the valve is closed. As back-pressure increases in the annulus the horsehead pumpjack must work harder to overcome the back-pressure. The casing head gas can be utilized as the carrier gas in the pilot plasma or to provide initial angular momentum prior to energizing the RF coils to increase plasma volume.

The present invention can also find use in landfill applications. Currently, many landfills flare the biogas produced from the landfill. Biogas is comprised primarily of methane and carbon dioxide with trace amounts of hydrogen sulfide and hydrogen chloride. Biogas is usually flared because of its low energy value. The low energy value equates to a low market value. The present invention can upgrade biogas to syngas while simultaneously converting MSW to syngas and ash. This eliminates the need for increasing the size of the landfill. Likewise, current landfills can be remediated with the present invention.

Referring to FIG. 6A hereof, the biogas may be used as the fluid for producing angular momentum with jet nozzles. Further, steam or biogas may be used as the carrier gas in the pilot plasma torch. MSW is conveyed to the reactor with a system similar to 107 in FIG. 5 hereof. Any means for conveying that allows the control of the amount of air that enters the reactor can be used. For example, in FIG. 5 hereof, inlet D is used to supply steam to hopper 109 to form a steam blanket for reducing air intake into the reactor. Returning back to FIG. 6, RF coils are energized to increase the plasma volume and increase angular momentum. As a result, the MSW is comminuted, reformed and separated from the syngas in a single vessel. The MSW ash exits the reactor through the bottom outlet while the syngas exits the reactor through the top outlet. The syngas can be further purified with a scrubber. The ash may contain very fine metals, glass, etc. which can be recycled or used as backfill in the landfill.

Practice of the present invention eliminates disposal of MSW into landfills. Further, the apparatus used in the practice of the present invention can be scaled down from a landfill size unit to commercial and residential size units. This would reduce the amount of energy used for the transportation of MSW to landfills. Also, household garbage could be converted to syngas for use as a fuel at home in a small fuel cell or gas turbine engine, thus reducing electrical demand at homes.

Figure 7:
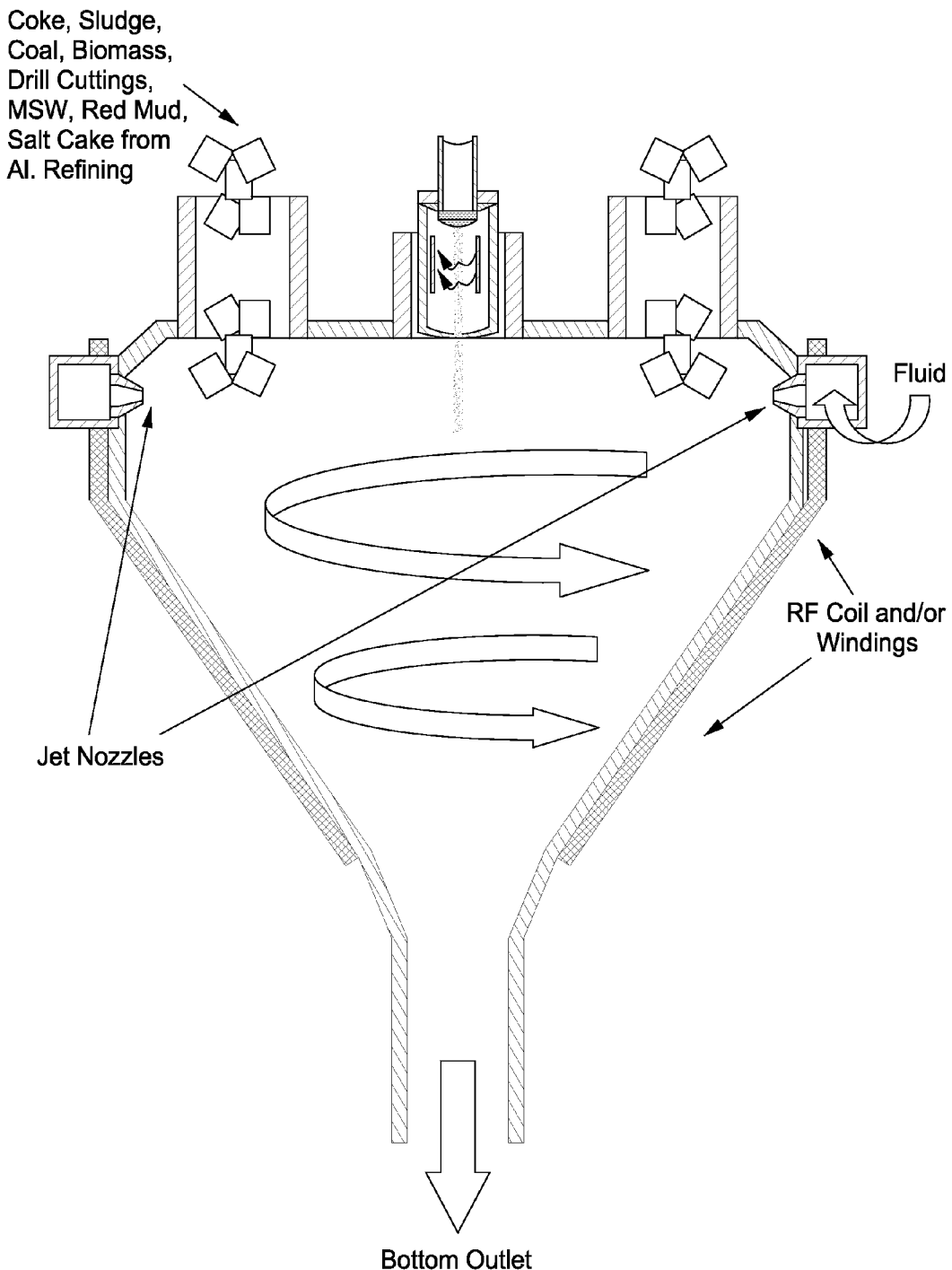
FIG. 7 is a diagrammatic, cross-sectional side view of another embodiment Hyper Plasma Jet Mill Reactor.
Figure 7A:
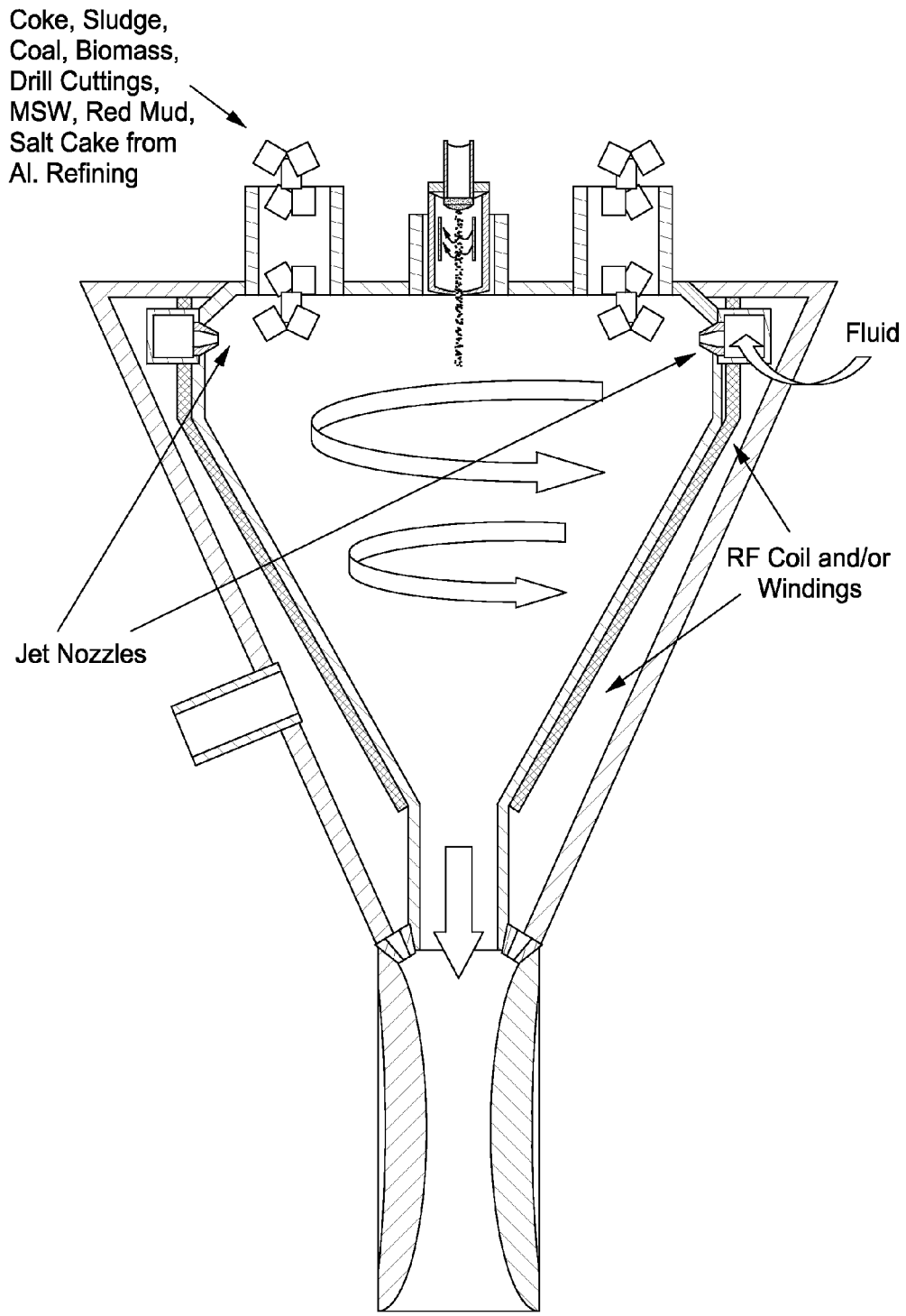
FIG. 7A is a diagrammatic, cross-sectional side view of another embodiment Hyper Plasma Jet Tornado Eductor Reactor.

An eductor (not shown) can be attached to the top outlet or bottom outlet or both to perform several functions in the apparatus represented in FIG. 6A hereof. FIG. 7A hereof shows such a system. An eductor is attached to the outlet of the reactor. It will be understood that the eductor maybe fabricated as an integral part of the reactor.

By attaching the eductor to the reactor several unexpected results can occur. First, the pilot plasma can be further radially constricted and axially lengthened to the point of reaching the eductor jets. Second, depending upon the type of eductor motive fluid used, reactions can be quenched immediately. Third, the eductor motive fluid and the eductor can be used as a direct heat recovery method. Fourth, by selecting an ideal eductor such as a Peri-Jet® Eductor manufactured by Derbyshire, Inc., the plasma can be entrained into the motive fluid. This opens the door for numerous applications. For example, the Plasma Whirl Reactor of the present invention can be used with substantially pure oxygen to produce atomic oxygen. Drinking water or wastewater effluent that must be disinfected can be disinfected with the atomic oxygen. Next to flourine, atomic oxygen has the second highest oxidation potential. Some unexpected results for this application can be summarized as follows:

(1) The central plasma vortex is constricted and lengthened due to angular momentum provided by both the jets and RF coils.
(2) The high plasma temperature at the core of the vortex keeps the oxygen molecule dissociated into atomic oxygen.
(3) By coupling the plasma with the eductor motive fluid the atomic oxygen can enter the water as atomic oxygen for disinfection purposes.

Figure 9:
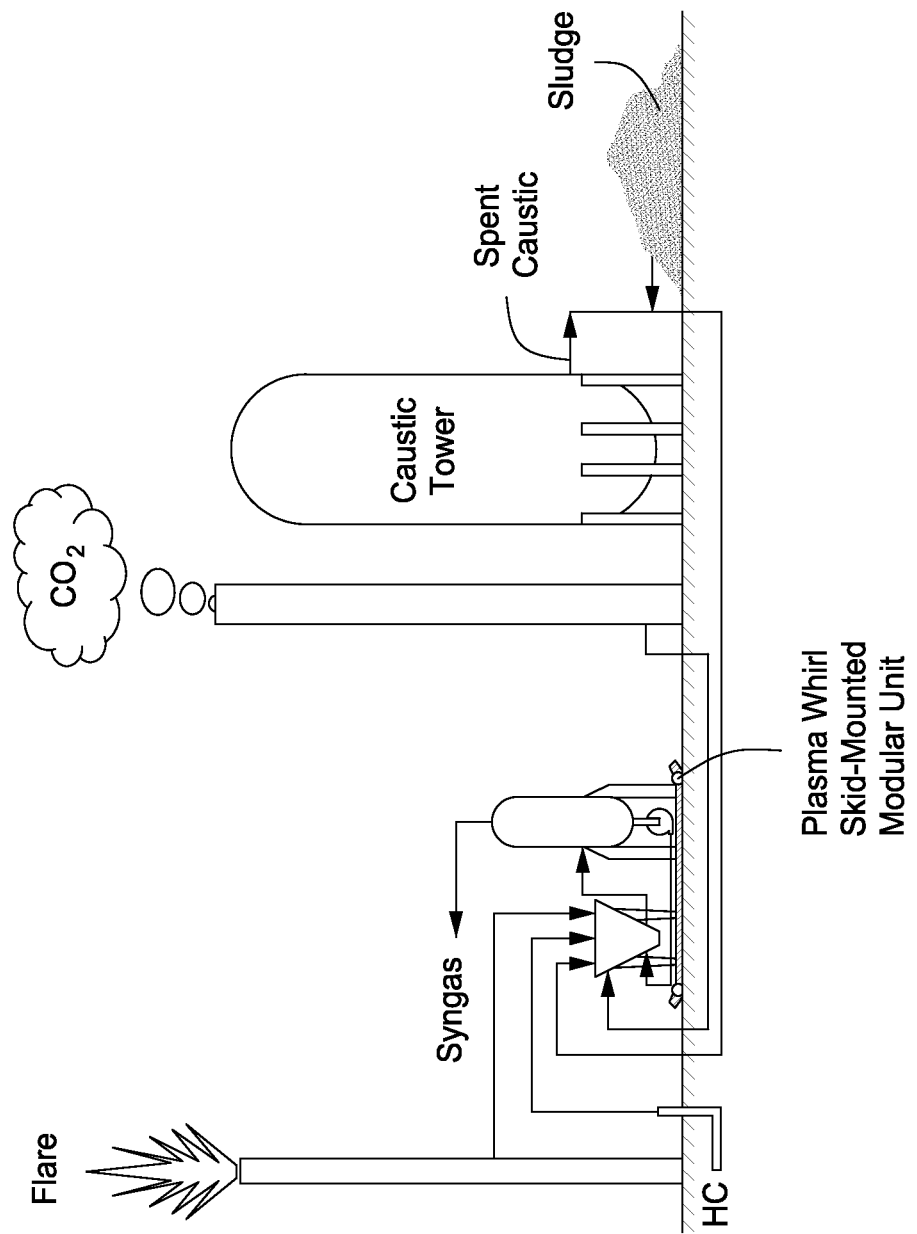
FIG. 9 is an illustration of an embodiment of the Plasma Whirl Reactor in an Ethylene Oxide Plant utilized as a Zero Release Method.

Referring to FIG. 9 hereof, the present invention can be practiced in one of its most preferred modes—simply as a $CO_2$ reformer in an ethylene oxide plant. The bottleneck in most ethylene oxide plants is the production of $CO_2$. Some ethylene oxide plants may have trace amounts of ethylene oxide within the $CO_2$ released to the atmosphere. The present invention provides a solution for achieving substantially zero emissions.

Scrubber 300 is filled with a suitable scrubbing solution selective to remove carbon monoxide, carbon dioxide or both. Non-limiting scrubbing solutions that can be used herein include those based on an amine or ethanol. $CO_2$ from the ethylene oxide plant is flowed into the reactor via inlet 103. Methane, or any other hydrocarbon source, is flowed into the reactor via A or 110 (shown in FIG. 3 hereof). The ethylene oxide contaminant within the $CO_2$ is reformed in combination with the $CH_4$ and $CO_2$ to form hydrogen and carbon monoxide. The syngas is purified with the scrubbing solution. Next the purified syngas is piped to an end user such as a refinery. It will be understood that the CO can be steam reformed to $CO_2$ and $H_2$. It will also be understood that any VOC streams that are flared within the plant can be used to replace the methane stream. Thus, this would eliminate and achieve zero discharge for both $CO_2$ and flares.

If the EO plant desires to produce a substantially pure hydrogen stream while simultaneously capturing the carbon, the present invention can be operated in a carbon sequestration mode. This can be accomplished by the addition of red mud, or a source of calcium oxide or magnesium oxide.

Many petroleum refineries use a water solution of sodium hydroxide (caustic soda) to treat light products such as gasoline. In its basic form, caustic treating of gasoline involves washing the gasoline with a solution of caustic, followed by a water wash of the gasoline to remove any residual caustic from the gasoline product. Caustic treating neutralizes and removes acidic compounds contained in the gasoline, such as phenols (crysilic acids), hydrogen sulfide, hydrogen cyanide, carbon dioxide and mercaptans. A number of variations of the basic caustic treating process and various treating technologies are available. Depending on the refinery configuration and the processes used, the production of spent caustic can be in the range of 3 gallons to 70 gallons of spent caustic per barrel of crude oil processed, and can be produced on a semibatch or continuous basis.

Spent caustic from gasoline treating contains the sodium salts of various acids, soluble gasoline components, dimers of mercaptans (disulfides) and unreacted caustic. Although refinery spent caustic usually is not considered a RCRA hazardous waste, it is corrosive and can generate explosive vapors. If acidified, toxic gases such as hydrogen cyanide and hydrogen sulfide can be generated In ethylene plants, acid gases ($CO_2$ and $H_2S$) are treated in an absorber using a mild caustic solution. The spent caustic becomes saturated with an array of hydrocarbon components including heat sensitive polymer precursors and monomers such as carbonyls, dienes, and styrenics. The presence of organics in the spent caustic acts as a poison to appreciably retard the preferred oxidation chemistry in downstream wet air oxidation (WAO) reactors, and would also cause polymer formation and fouling of the reactors. These organics also make the solution environmentally hazardous and thus limits its use for integration with the pulp and paper industry or other metal treatment processes. Therefore, it is essential to free the spent caustic from dissolved polymer precursors and their monomers prior to WAO or if the spent caustic is to be used for alkali content.

Referring again to FIG. 6A hereof, a hydrocarbon source, such as flare gas, is used as the fluid for producing angular momentum with jet nozzles. Steam may be used as the carrier gas in the pilot plasma torch. Red Mud is conveyed to the reactor with a system similar to 107 in FIG. 5 hereof. Any means of conveying that allows for control of the amount of air that enters the reactor can be used. For example, in FIG. 5, inlet D is used to supply steam to hopper 109 to form a steam blanket for reducing air intake into the reactor. Returning to FIG. 6 hereof, RF coils are energized to increase the plasma volume and increase angular momentum. As a result, the Red Mud is comminuted while simultaneously allowing the calcium oxide and magnesium oxide within the red mud to capture carbon dioxide formed during the cracking, reforming and water-gas shift reactions.

The Red Mud byproduct exits the reactor through the bottom outlet while the hydrogen exits the reactor through the top outlet. The hydrogen stream can be further purified with a scrubber. The Red Mud byproduct can now be used for absorbing liquid wastes such as oil spills. Not wishing to be bound by theory, it is believed that the Red Mud can be utilized in situ in the present invention to enhance hydrocarbon synthesis. For example, Red Mud contains metals, which are used in present day catalysts for Olefins production.

Conventional fluidized bed process units for olefin production are such that the solids residence time and the vapor residence time cannot be independently controlled, especially at relatively short vapor residence times. For the production of olefins it is preferred that the vapor remain in the reactor for less than a second while the catalyst remains in the reactor for a longer period of time. Typically the catalyst may remain in the reactor from 15 to 60 seconds.

The present invention's reactor as shown in FIGS. 4, 5, or 6 hereof may be well suited for carrying out the aforementioned production of olefins. Not wishing to be bound by theory, it is believed that olefin production can be enhanced in the following manner:
1. Use the olefin feedstock to generate Plasma Whirl,
2. Plasma Whirl produces angular momentum,
3. Red Mud is conveyed to the reactor to be comminuted and separated in the plasma whirl due to centrifugal force,
4. the Red Mud remains in the reactor longer due to centrifugal force,
5. Red Mud and Olefins exit the center of the reactor, and
6. the materials are flowed such that olefins production is maximized while methane production is minimized.

Also, in another mode, Red Mud can be used in the present invention for the production of substantially pure hydrogen. It is well known that the production of aluminum is energy intensive. Aluminum smelters require a low DC voltage. The present invention allows for an alumina or aluminum plant to become a so-called "Over-The-Fence" hydrogen producer. The present invention can be mobilized onsite at the alumina plant or at the most economical site with respect to the source of the organic or hydrogen containing material. For example, the apparatus of the present invention can be located near a petroleum refinery. The refinery provides coke as the carbon source for the apparatus. The coke and Red Mud are flowed into the reactor. The final products are treated Red Mud and hydrogen.

An aluminum plant may opt to install the apparatus of the present invention onsite or near a coal burning power plant. A relatively cheap source of carbon, such as coal fines, produced from coal burning power plants may be used as the carbon source. However, aluminum plants located in a forested region, such as the US Pacific Northwest, may opt to use a virgin product such as wood chips as the carbon source. If installed onsite at an aluminum facility, the apparatus allows for the ideal production of aluminum with respect to energy conservation and environmental emissions. In lieu of burning the hydrogen as fuel in a boiler or gas turbine engine, it would be highly advantageous to use the hydrogen in a fuel cell. Since fuel cells produce a low voltage DC source of electricity and aluminum smelters utilize 5 volts DC, then this application of the present invention allows for an ideal use.

Additionally, the Red Mud may be slurried with waste oil or a crude oil with a low API gravity and flowed into the Plasma Whirl Reactor of the present invention. The Red Mud byproduct can then be used for mopping up oil spills and subsequently allowing for recovering the energy value of the oil by processing the oil absorbed in the Red Mud in the apparatus of the present invention. It has been demonstrated that in combination with the present invention, Red Mud can become a valuable commodity for an aluminum plant and may no longer be viewed as a waste disposal problem.

Not wishing to be bound by theory, it is believed that the $TiO_2$ in the Red Mud treated by the present invention, may be separated from the iron and alumina and recovered from the Red Mud. This further enhances the value of the Red Mud when processed through the present invention's apparatus or method.

The present invention can also be applied as a spent acid regeneration plant in a refinery. As previously mentioned, the bottleneck in most SAR plants is the volume of gas produced due to combusting the spent acid with a fuel and oxidant. The present invention provides a solution for the problems inherent in modern day SAR plants.

In FIG. 2 hereof, spent acid can be pressurized and used as the fluid for providing angular momentum to the reactor. The jet nozzle ring is designed such that pressurized spent acid fluid is atomized after exiting the nozzles and upon entry into the reactor. In this mode, a waste inlet may not be needed since the pressurized spent acid fluid is the waste.

Referring to FIGS. 3, 3A, 3B and 3C hereof, pilot plasma gas A is conveyed to the pilot plasma torch 102 to create pilot plasma 101. The pilot plasma gas A may be selected from $SO_2$, $H_2S$, steam, $O_2$, $CO_2$ or any gas commonly found in a refinery. The most preferred gas is one with a low ionization potential and which does not add an unwanted gas and an increased gas volume to the SAR plant.

Spent acid B is pressurized and conveyed into the reactor via inlet 103. The spent acid is atomized upon exiting the nozzles or slits 104. This creates angular momentum within the reactor. Once again, the pilot plasma 101 is elongated and constricted along the longitudinal axis to form the elongated pilot plasma 101A. Upon energizing the RF coils 105, the plasma volume increases dramatically, which further increases angular momentum. The large plasma 101B is created with the atomized spent acid. Thus the spent acid B must transition through the large plasma 101B and the elongated plasma 101A in order to exit the reactor.

Referring again to FIG. 6A hereof, the reactor can be configured to remove any solids or ash present in the spent acid. Once again, the spent acid fluid enters the reactor via jet nozzles that are tangentially aligned to impart angular momentum to the reactor (similar to plasma torches shown in FIG. 1 hereof). Upon exiting the jet nozzles, the spent acid fluid is atomized, entrained and converted into a plasma via wave energy provided by the RF coil. The solids exit the bottom outlet while gases exit the top outlet. It will be understood that a cyclone separator constructed of a refractory material transparent to RF energy may be used in the present invention.

In another embodiment of the present invention, the reactor can be configured in accordance with FIG. 7A hereof and adapted to a scrubber or absorption tower 300 as shown in FIG. 8 hereof. For example, the tower or scrubber 300 may be filled with a solution selective to modern day SAR plants for dehydrating a $SO_2$ stream.

In another preferred embodiment, the plasma whirl reactor opens the door for integrating an $H_2S$ stream into a SAR plant. The SAR plant and Claus plant are separate operating units in a refinery. However, the reactions and products of the two plants can easily be integrated into one unit. Not wishing to be bound by theory, it is believed that feeding $H_2S$ stoichiometrically with spent sulfuric acid in the Plasma Whirl Reactor of the present invention can produce the following reaction and products:

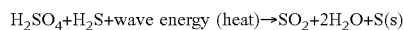

$H_2SO_4 + H_2S + \text{wave energy (heat)} \rightarrow SO_2 + 2H_2O + S(s)$

Since the $H_2SO_4$ is providing the oxygen for partial oxidation of $H_2S$ to water and sulfur, than either reactant can be controlled to optimize plant conditions. Also, this novel application of the Plasma Whirl Reactor substantially reduces the size of the spent acid regeneration plant as well as the Claus plant.

For example, by utilizing the plasma cyclone separator reactor, it is believed that the sulfur can be separated from the $SO_2$ and $H_2O$ in situ. It will be understood that the organics in the spent acid may be converted to carbon and hydrogen or react with the $H_2O$ to form syngas. Since hydrogen and carbon monoxide or both powerful reducing agents, then both may want to react with the $SO_2$ to shift back to $H_2S$ and $O_2$ or $H_2S$ and $CO_2$. By adding a stoichiometric amount of $O_2$ to further react with the syngas the reaction can be driven to near completion.

In addition, a sufficient amount of $O_2$ may be added to the reactor in order to oxidize the solid sulfur, in order to maximize $SO_2$ production while minimizing solid sulfur production. Or the $H_2S$ may be fed to the plasma whirl reactor at a rate less than $H_2SO_4$ feed. As a result the oxygen will react with hydrogen and carbon monoxide to form $H_2O$ and $CO_2$. Next, the $SO_2$ rich stream may be scrubbed to remove water and to cool the stream to an ideal temperature for conversion to $SO_3$ in the downstream converter. However, it will be understood that a heat recovery unit may be installed upstream of the scrubber in order to recover the heat value of the stream. After dehydration of the $SO_2$ rich stream, air or oxygen may be added in order to oxidize $SO_2$ to $SO_3$ in the converter. It will be understood that dilution air may be added before the dehydration process. The purpose of adding air after or during cooling is to avoid the production of nitrogen oxides. The present invention can also be used to recover spent catalysts, such as Group VIII/Group VI hydrotreating catalysts from petroleum and petrochemical streams.

The present invention can also be used in Spent Acid Regeneration which overcomes the obstacles in modern day SAR combustion furnaces. Quite simply the energy is added in the form of wave energy vice in the form of a fuel and oxidant. Additionally, since air is not added in the plasma whirl reactor, an unsuspected result occurs. $NO_x$ is not produced, thus this eliminates the environmental problems associated with $NO_x$ production due to high temperatures associated with current refinery Claus and SAR plants operations.

A primary problem associated with burning agriculture and forestry wastes in boilers is the moisture content of the waste. Another problem associated with burning agriculture wastes is the composition of the waste. Agriculture and forestry waste that present special problems are bagasse from sugarcane mills, rice straw, rice hulls, animal litter and black liquor from pulp and paper mills.

Pulp and paper production is among the most energy intensive segments of all manufacturing industries. Combustion of kraft black liquors is primarily done to recover chemicals for cooking. Without chemicals recovery, the process would be uneconomical. However, in recent years, the efficiency of black liquor combustion has been improved so that now mills are more nearly energy self-sufficient. Black liquor combustion is combined with the combustion of bark and other wood fuels. The black liquid recovery boiler presents problems of operation and safety that far exceed those of the conventional power boiler.

Likewise, the most prevalent cause of explosions when utilizing the furnace for thermal oxidation of NCG is the presence of terpenes (turpentine vapor). Static electricity or an electrical spark or reaching the auto-ignition temperature of 487° F. of the pinene can lead to an explosion. The upper and lower explosion limits for turpentine vapor are not very well defined, but the explosion range is known to be very wide.

The $SO_2$ produced in a recovery boiler during the thermal oxidation of black liquor is scrubbed by the alkali fume present in the upper furnace to form sodium sulfate ($Na_2SO_4$). Simply, the feed streams to the furnace also act as scrubbing chemicals. The limiting factor for $SO_2$ scrubbing is the amount of alkali hydroxides, sodium and potassium, that are present in the furnace. Although there are many reactions that occur in the recovery boiler, the primary goal is to maximize smelt production for transforming the smelt into green liquor and then into white liquor. Thus, the pulp and paper mills caustic area has a main objective of converting sodium carbonate ($Na_2SO_3$) to sodium hydroxide by slaking calcium oxide (CaO) to form calcium hydroxide (CaOH). The CaOH is then reacted with the $Na_2SO_3$ to form sodium hydroxide (NaOH). The calcium carbonate ($CaCO_3$) also known as lime mud is converted to CaO and $CO_2$ in a rotary kiln. This last step is known as calcination.

Referring again to FIG. 1 hereof, black liquor can be injected into the inlet and converted to smelt. The plasma torches that are aligned tangentially utilize $CO_2$, steam, turpine vapors or noncondesible gases as the carrier gas. Although not shown the smelt exits the bottom while gases exit the top outlet.

Referring again to FIG. 6A hereof, black liquor is injected into the reactor via jet nozzles that are aligned tangentially to create a vortex. Wood chips or any other wastes are conveyed and injected into the reactor through a secondary inlet. Once again gases exit the top outlet while solids such as smelt exit the bottom outlet.

The present invention also gives rise to a novel hydrogen production facility at a pulp and paper mill. Not wishing to be bound by theory, it is believed that the addition of CaO to the reactor will produce $CaCO_3$ and $H_2$. The $CO_2$ that reacts with the CaO is the product of reacting carbon and oxygen which are part of the black liquor. Additional steam may be added to the reactor to increase $H_2$ production. The sodium and sulfide may be recovered directly as caustic soda and sodium sulfide from the bottom of the reactor.

However, a pulp and paper mill can save on lime costs by simply using red mud. The process for producing hydrogen from red mud has been previously explained. Simply, the black liquor provides the source of carbon necessary in the reaction. A benefit to this process is that the mill may produce $TiO_2$ that is suitable for use in paper products. Thus, the mill saves on the cost of purchasing both lime and $TiO_2$.

Two major problems are associated with burning bagasse in boilers. First, the bagasse contains 50% moisture. Thus, boilers must be sized accordingly in order to handle the additional the additional flue gases produced due to the moisture (steam). This results in a very large boiler. Likewise, bagasse is not finely ground in modern day mills. As a result, it is common to find large clinker production in modern day sugarcane mill boilers. Also, mills produce a very large volume of bagasse. Typically, a 10,000 ton day cane mill will produce about 1,500 tons per day of bagasse. Thus, the boiler is operated as an incinerator in order to eliminate the bagasse and prevent stockpiling of the cane stalk residue.

Rice harvesting and milling produces two products that present problems. Rice straw is difficult to feed to a boiler. Rice hulls have a high silica content that also results in clinker formation.

Animal litter presents a problem unique to operating conditions. First, Animal Feed Operations (AFOs) range from very small operators (300 head of cattle or less) to operations that may have greater than 10,000 animals in a confined feeding location. Likewise, AFOs range from poulty feed houses to very large commercial dairy operations. Thus, the amount of litter or manure produced at each facility varies dramatically.

The present invention's modular plasma whirl reactor allows for scaling up and down quite easily. Thus, the various solid, liquid and gaseous wastes and volumes produced at sugar mills, poultry houses, rice mills, rice farms, or at pulp and paper mills can be converted to syngas without the need for pretreating the wastes by utilizing the present invention's plasma whirl reactor.

Referring again to FIG. 5 hereof, wet bagasse or any of the aforementioned agriculture and forestry wastes, can be fed into the inlet. The moisture in the bagasse is utilized to react with the carbon in the bagasse fiber to form syngas. Pretreatment methods such as drying or grinding are not necessary or required in the present invention. In addition, there are several benefits derived from operating the plasma whirl reactor as a bagasse gasifier. First, the syngas produced from the plasma whirl reactor can be used a fuel for a very small package boiler or gas turbine engine in lieu of a large boiler. Second, the finely comminuted flyash produced in the plasma whirl reactor can be utilized as a cement additive.

Another unsuspected but highly desirable result is achieved with the plasma whirl reactor of the present invention. It is well known that many jet mills have a difficult time processing non-friable material. Friable simply means a material that can be crushed into a powder. For example, wet bagasse is not a friable material. However, when processed in the Plasma Whirl Reactor, as the bagasse is converted to char or charcoal, a friable material, the bagasse ash is then finely comminuted to a flyash powder. Thus, the problem of producing large clinker from burning bagasse in typical boilers does not occur in the plasma whirl reactor.

Based upon this unsuspected result, the plasma whirl reactor may be an ideal solution for replacing long rotary kilns used in the production of cement. In lieu of a rotating kiln and pug mill, the material is simply added to the plasma whirl reactor to form powered clinker (cement). Thus, the process eliminates the long rotating kiln and the pug mill that crushes the clinker.

Figure 14:
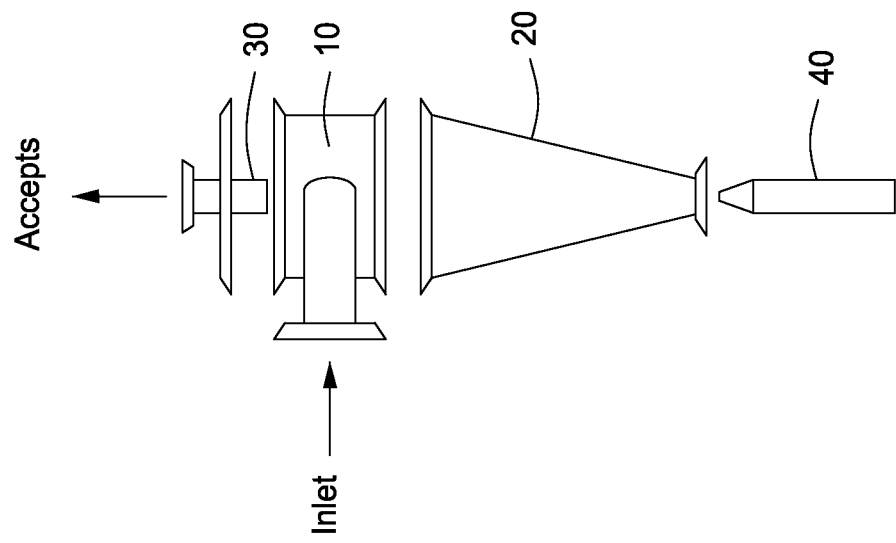
FIG. 14 is a Plasma Whirl Forward Flow Hydrocyclone in accordance with one embodiment of the present invention.

Turning now to FIG. 14, a Plasma Whirl Forward Flow Hydrocyclone was constructed by utilizing off-the-shelf components. First, a sanitary type stainless steel volute 10 was attached to a 4 inch by 2 inch concentric reducer 20. A vortex finder 30 was attached to the top of the volute 10. A copper anode was silver soldered to the vortex finder 30. Next, an ESAB model PT-19 plasma torch 40 powered by ESAB's Deuce Pack™ Power Supply, rated at about 60 kw was attached directly to the anode vortex finder 30.

Water was flowed into the volute via the inlet. When an air core was formed within the hydrocyclone the plasma torch 40 was turned on. The plasma arc was transferred from the plasma torch to a water cooled anode vortex finder 30. The water that was being treated was the same water used for cooling the vortex finder anode 30. Quite simply, the water must be flowed at a sufficient volume and pressure to maintain a liquid flow around the vortex finder anode 30.

Next, two things occurred in which one was not expected nor immediately obvious. First, as expected the system produced ozone when air was added as shield gas to the plasma torch 40. This was noticeable due to the odor produced by ozone. What occurred next was completely unexpected and is at the center of the present invention. The plasma whirl hydrocyclone accepts was discharged into a mild steel tank. Within minutes the water began turning red. Later, after the tank was emptied it became obvious why the water changed colors—the iron from the mild steel oxidized and precipated out of the water.

Not being bound by theory it is believed that the present invention produces copious amounts of atomic oxygen and is somehow entrained and reacted within the water stream.

In addition, it is believed that copious amounts of hydroxyl radicals are formed by the direct photolysis of water from the vacuum UV radiation produced from the plasma arc. Furthermore, the combination of UV radiation and ozone produces yet another hydroxyl radical formation pathway.

Figure 15:
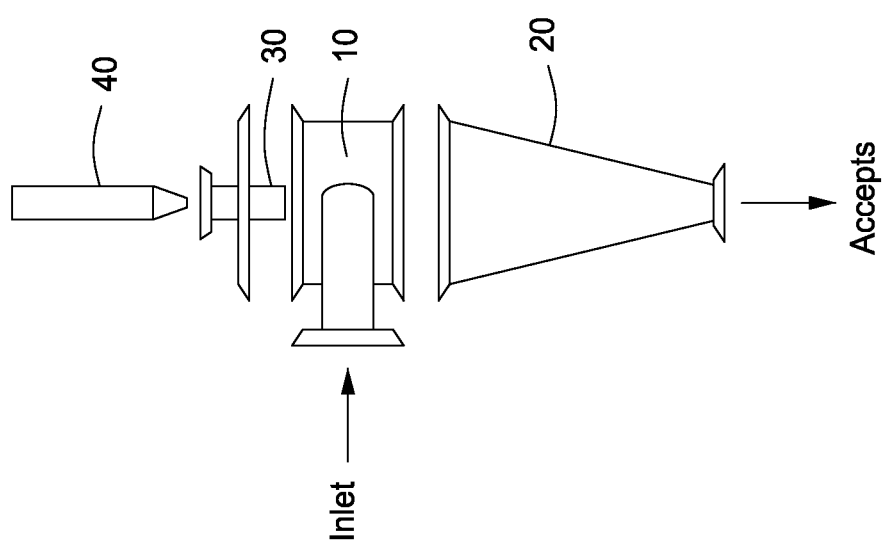
FIG. 15 is a Plasma Whirl Reverse Flow Hydrocyclone in accordance with another embodiment of the present invention.

The present invention's method allows for easy retrofitting of a reverse flow hydrocyclone. Referring to FIG. 15, a Plasma Whirl Reverse Flow Hydrocyclone is shown. The plasma torch 40 is located near the underflow of the hydrocyclone's concentric reducer 20. It is well known and well understood that a typical reverse flow hydrocyclone utilizes an apex valve in order to give a specific cut for the rejects. In the present invention's method the apex valve becomes the anode. Thus, any solid or liquid rejects must pass directly through the arc.

Figure 16:
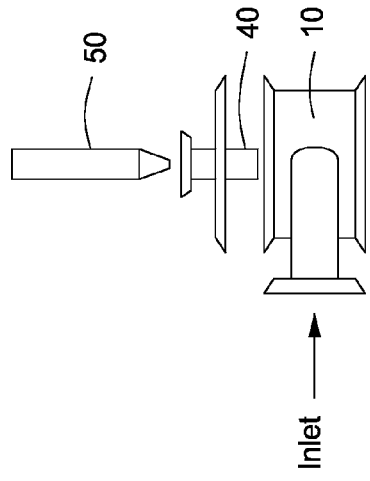
FIG. 16 is a Plasma Whirl Through Flow Hydrocyclone in accordance with yet another embodiment of the present invention.
Figure 16:
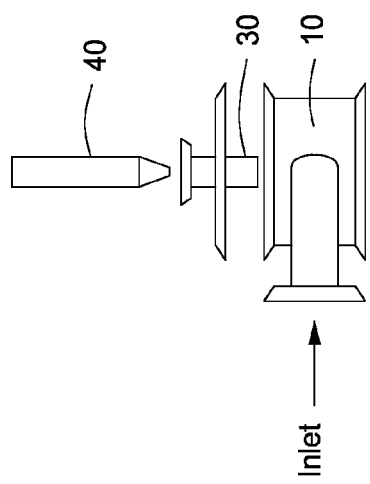

The present invention was reconfigured as shown in FIG. 16 where a Plasma Whirl Through Flow Hydrocyclone is shown. A second volute 11 was attached to the concentric reducer 20 via an adapter plate 50. The Plasma Whirl Through Flow Hydrocyclone System was operated in a horizontal position. When in operation, UV radiation was irradiated out of a rejects vortex finder 31 and was noticeable on a wall about 50 feet away. Likewise, only a hot water vapor was discharged from the rejects.

This in turn has led to another application for treating any water that has soluble compounds such as salts. During the test, the water heated rapidly and began producing steam from the vortex finder 31. Likewise, the entire contents of the tank increased in temperature to the point that the surface water in the tank began to evaporate.

The Plasma Whirl Through Flow Hydrocyclone System can be used as a effective flash type evaporator by drawing a suction on the vortex finder 31. It will be understood that a heat recovery condenser can be used to preheat the inlet feed by recovering the latent heat in the water vapor. The rejects which now becomes the accepts or distilled water is condensed with the inlet feed. A vacuum would be drawn on the condenser in order to flash water at a lower pressure.

This simple, compact and portable plasma desalination system would have world wide applications in desert and arid regions. Another novel aspect of the present invention is that if the salt water contains volatile organics, the organics will be oxidized or gasified and will not contaminate the distillate.

And yet another application for the present invention can be found in the medical industry. Water For Injection (WFI) is an ultrapure water that is used for making intravenous solutions and medications that are injected via a needle. A major problem that has not been solved to date is that small amounts of ammonia will slip through reverse osmosis membranes. The ammonia can be oxidized within the high temperature plasma core.

Figure 17:
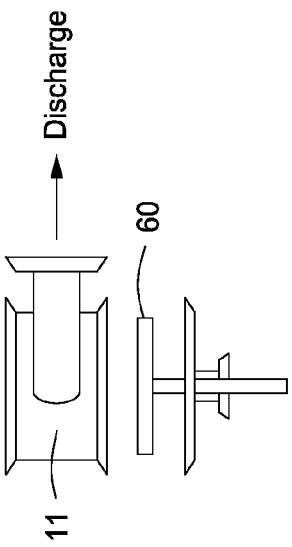
FIG. 17 is a Plasma Whirl Hydrocyclone Pump in accordance with another embodiment of the present invention.
Figure 17:
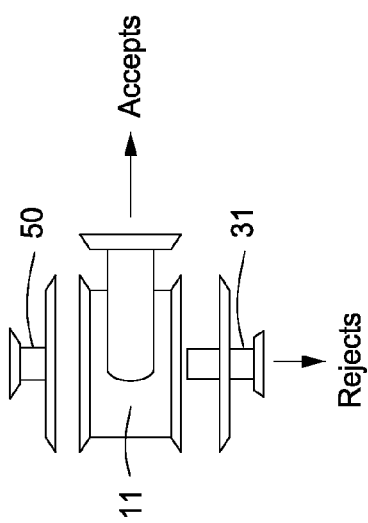

Next, referring to FIG. 17, a Plasma Whirl Hydrocyclone Pump is shown. The plasma whirl system was again reconfigured in order to test it's capabilities. An impeller 60 was added to the volute 11. Of course this configuration is easily to replicate by simply installing a concentric reducer 20 on the suction side of a standard centrifugal pump. Water was flowed into the volute 10 via the inlet. Next, the pump was turned on which imparted additional angular momentum to the water. The plasma torch 40 was turned on. The discharge of the pump flowed into a filter. The filter maintained a constant pressure of 20 psig. This configuration gives rise to a novel stand alone water or wastewater treatment system.

The pump thoroughly shears both atomic oxygen and ozone directly into the water. Likewise, due to the plasma core within the reactor, the pump cavitates. Cavitation will add more energy to the reactions.

Figure 18:
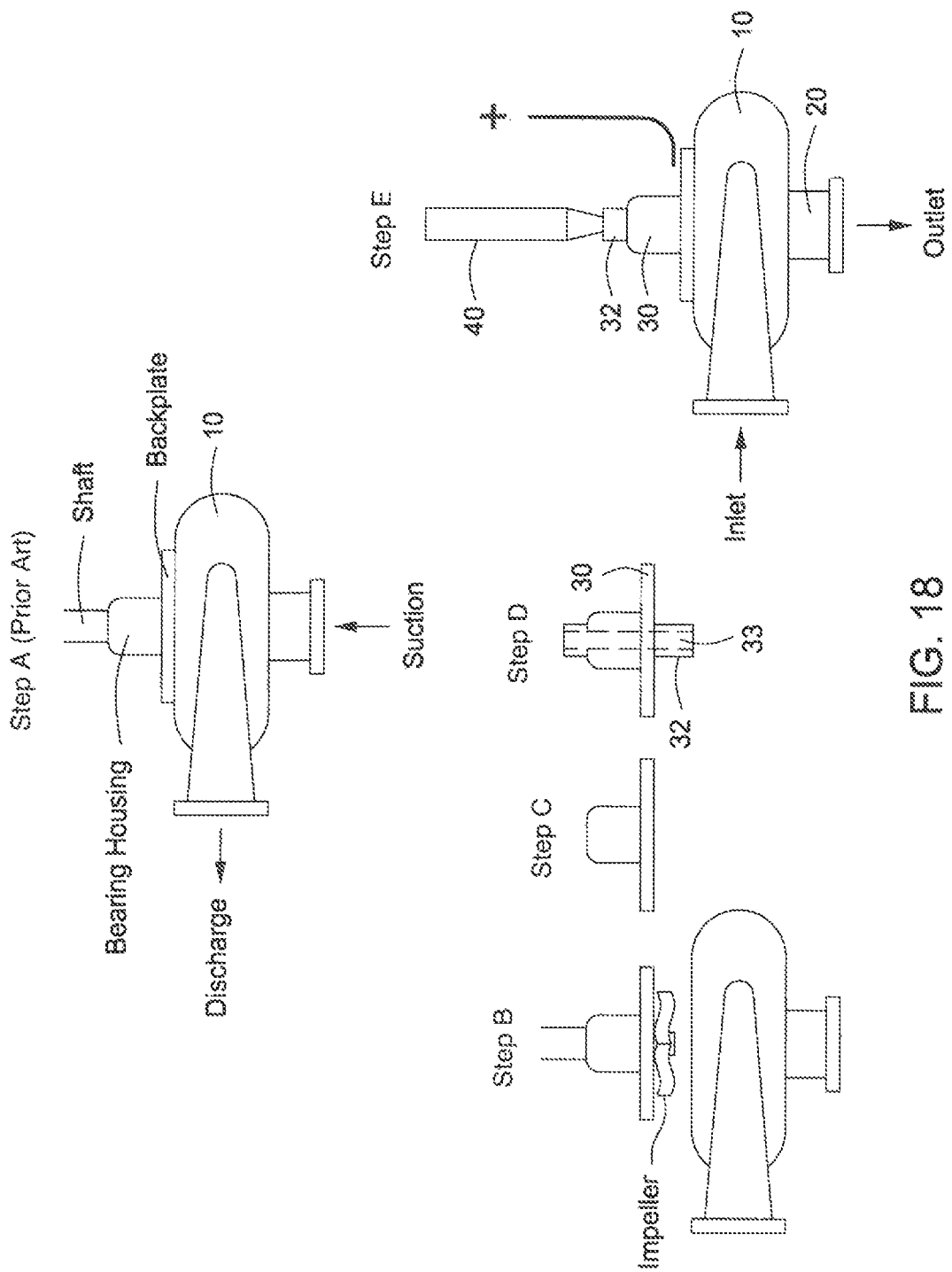
FIG. 18 is a Plasma Whirl Volute in accordance with another embodiment of the present invention.

Once again at the center of the present invention is the use of off-the-shelf components to produce a compact, robust and rugged plasma water treatment system. Referring to FIG. 18—Plasma Whirl Volute—a standard centrifugal pump is shown in FIG. 18-Step A. The following steps can be followed to build the Plasma Whirl Volute:

1. Remove impeller and backplate from pump volute as shown in FIG. 18- Step B
2. Remove the shaft from the backplate and bearing housing in accordance with FIG. 18-Step C
3. Machine an anode 32 from an electrically and thermally conductive material such as copper as shown in FIG. 18-Step D.
4. Drill a hole 33 through the copper anode 32
5. As shown in FIG. 18-Step E, replace the backplate 30 and anode assembly 32 unto the volute 10.
6. Next, attach the plasma torch 40 to the anode 32.

The Plasma Whirl Volute is now ready to be applied to any liquid that requires extreme oxidation via atomic oxygen, ozone and UV radiation. Likewise, it now becomes quite obvious that the Plasma Whirl Volute can be attached to a tank and a vortex finder can be installed at the opposite end of the tank. Thus, liquid streams such as heavy crude oil, oilsands and black liquor can be gasified or upgraded and the products can be discharged as accepts, while the waste such as sand is discharged via the rejects.

With respect to ballast water treatment, the Chief Engineer of the ship simply needs to retrofit any centrifugal pump by following the method in FIG. 18. Next, for $15,000 US, he can purchase an ESAB ESP 150 Deuce Pack with a PT-19 torch. The ship will now have a 60 KW atomic oxygen, ozone and UV radiation water treatment system. Only slight piping modifications are required to install the Plasma Whirl Volute. Any size centrifugal pump can be used to practice the present invention.

The foregoing description of the apparatus and methods of the invention in preferred and alternative embodiments and variations, and the foregoing examples of processes for which the invention may be beneficially used, are intended to be illustrative and not for purposes of limitation. The invention is susceptible to still further variations and alternative embodiments within the full scope of the invention, recited in the following claims.

What is claimed is:

1. A method for treating a liquid comprising the steps of:
providing an apparatus comprising (a) a hydrocyclone having a side inlet, a lower outlet and an upper opening, (b) a throat having a first opening and a second opening, wherein the first opening is connected to the lower outlet of the hydrocyclone, (c) a vortex finder attached to the upper opening of the hydrocyclone such that the vortex finder extends into the hydrocyclone, (d) an electrical connection attached to the vortex finder such that the vortex finder is an anode, and (e) a plasma torch attached to the vortex finder such that a central axis of the plasma torch, a central axis of the vortex finder and a central axis of the lower outlet are all aligned with one another;

flowing the liquid into the side inlet of the hydrocyclone and through the hydrocyclone such that the liquid cools the anode and exits through the lower outlet; and turning on the plasma torch such that a plasma arc irradiates the liquid.

2. The method as recited in claim 1, wherein the hydrocyclone is a forward flow hydrocyclone, a reverse flow hydrocyclone, a through flow hydrocyclone, a hydrocyclone pump or a volute.

3. The method as recited in claim 1, wherein the liquid comprises waste water, water or salt water or a combination thereof.

4. An apparatus for treating a liquid comprising:
   a pump volute or hydrocyclone head having a side inlet, a lower outlet and an upper opening;
   a throat having a first opening and a second opening, wherein the first opening is connected to the lower outlet of the pump volute or hydrocyclone head;
   a vortex finder attached to the upper opening of the pump volute or hydrocyclone head such that the vortex finder extends into the pump volute or hydrocyclone head;
   an electrical connection attached to the vortex finder such that the vortex finder is an anode;
   a plasma torch attached to the vortex finder such that a central axis of the plasma torch, a central axis of the vortex finder, a central axis of the lower outlet and a central axis of the throat are all aligned with one another; and
   wherein the liquid flows into the side inlet and through the lower outlet of the pump volute or hydrocyclone head into the throat, such that the liquid cools the anode, is irradiated by a plasma arc from the plasma torch, and exits through the second opening of the throat.

5. The apparatus as recited in claim 4, wherein the hydrocyclone is a forward flow hydrocyclone, a reverse flow hydrocyclone, a through flow hydrocyclone, a hydrocyclone pump or a volute.

6. The apparatus as recited in claim 4, wherein the liquid comprises waste water, water or salt water or a combination thereof.

7. The apparatus as recited in claim 4, wherein the throat is straight or cone shaped.

8. A system for treating a liquid comprising:
   a storage tank;
   a pump volute or hydrocyclone head having a side inlet, a lower outlet and an upper opening;
   a throat having a first opening and a second opening, wherein the first opening is connected to the lower outlet of the pump volute or hydrocyclone head and the second opening is connected to a top of the storage tank;
   a vortex finder attached to the upper opening of the pump volute or hydrocyclone head such that the vortex finder extends into the pump volute or hydrocyclone head;
   an electrical connection attached to the vortex finder such that the vortex finder is an anode;
   a plasma torch attached to the vortex finder such that a central axis of the plasma torch, a central axis of the vortex finder, a central axis of the lower outlet and a central axis of the throat are all aligned with one another; and
   wherein the liquid flows into the side inlet and through the lower outlet of the pump volute or hydrocyclone head into the throat, such that the liquid cools the anode, is irradiated by a plasma arc from the plasma torch and flows through the second opening of the throat into the storage tank.

9. The system as recited in claim 8, wherein the hydrocyclone is a forward flow hydrocyclone, a reverse flow hydrocyclone, a through flow hydrocyclone, a hydrocyclone pump or a volute.

10. The system as recited in claim 8, wherein the liquid comprises waste water, water or salt water or a combination thereof.

11. The system as recited in claim 8, wherein the throat is straight or cone shaped.

12. The method as recited in claim 1, wherein the throat is straight or cone shaped.

13. The method as recited in claim 1, wherein the apparatus further comprises:
   a second hydrocyclone having a side outlet, a lower outlet and an upper opening;
   an adapter plate connecting the second opening of the throat to the upper opening of the second hydrocyclone; and
   a second vortex finder attached to the lower opening of the second hydrocyclone such that the vortex finder extends into the second hydrocyclone.

14. The method as recited in claim 1, wherein the apparatus further comprises:
   a second hydrocyclone having a side outlet, a lower outlet and an upper opening;
   an adapter plate connecting the second opening of the throat to the upper opening of the second hydrocyclone; and
   an impeller disposed within the lower opening of the second hydrocyclone.

15. The apparatus as recited in claim 4, further comprising:
   a second pump volute or hydrocyclone head having a side outlet, a lower outlet and an upper opening;
   an adapter plate connecting the second opening of the throat to the upper opening of the second pump volute or hydrocyclone head; and
   a second vortex finder attached to the lower opening of the second pump volute or hydrocyclone head such that the vortex finder extends into the second pump volute or hydrocyclone head.

16. The apparatus as recited in claim 4, further comprising:
   a second pump volute or hydrocyclone head having a side outlet, a lower outlet and an upper opening;
   an adapter plate connecting the second opening of the throat to the upper opening of the second pump volute or hydrocyclone head; and
   an impeller disposed within the lower opening of the second pump volute or hydrocyclone head.

* * * * *